(12) United States Patent  (10) Patent No.: US 8,247,915 B2
Crane et al.  (45) Date of Patent: Aug. 21, 2012

(54) ENERGY STORAGE SYSTEM UTILIZING COMPRESSED GAS

(75) Inventors: Stephen E. Crane, Santa Rosa, CA (US); Danielle A. Fong, Berkeley, CA (US); Edwin P. Berlin, Jr., Oakland, CA (US)

(73) Assignee: LightSail Energy, Inc., Berkeley, CA (US)

( * ) Notice: Subject to any disclaimer, the term of this patent is extended or adjusted under 35 U.S.C. 154(b) by 219 days.

(21) Appl. No.: 12/730,549

(22) Filed: Mar. 24, 2010

(65) Prior Publication Data

US 2011/0233934 A1    Sep. 29, 2011

(51) Int. Cl.
*F03D 9/00* (2006.01)
*H02P 9/04* (2006.01)

(52) U.S. Cl. .......................... 290/44; 290/55

(58) Field of Classification Search .............. 290/44, 290/55; 60/641.1, 641, 2, 398; 415/4.2, 415/4.5
See application file for complete search history.

(56) References Cited

U.S. PATENT DOCUMENTS

| | | |
|---|---|---|
| 1,751,537 A | 3/1930 | Vianello |
| 1,929,350 A | 10/1933 | Christensen |
| 2,025,142 A | 12/1935 | Zahm et al. |
| 2,280,845 A | 4/1942 | Parker |
| 2,284,443 A | 5/1942 | Paradise |
| 2,745,701 A | 5/1956 | Wahlin |
| 3,192,705 A | 7/1965 | Wendell S. Miller |
| 3,608,311 A | 9/1971 | Rosel, Jr. |
| 3,659,787 A | 5/1972 | Ito |
| 3,704,079 A | 11/1972 | Berlyn |
| 3,858,812 A | 1/1975 | Williams et al. |
| 3,862,590 A | 1/1975 | Mengeler |
| 3,877,229 A | 4/1975 | Resler, Jr. |
| 3,972,194 A | 8/1976 | Eskeli |
| 4,016,724 A | 4/1977 | Karlsson |
| 4,027,993 A | 6/1977 | Wolff |
| 4,097,000 A | 6/1978 | Derr |
| 4,170,878 A | 10/1979 | Jahnig |
| 4,295,518 A | 10/1981 | Rannenberg |
| 4,342,920 A | 8/1982 | Bucknam |
| 4,393,653 A | 7/1983 | Fischer |
| 4,426,847 A | 1/1984 | Fischer |
| 4,432,203 A | 2/1984 | Fischer |
| 4,484,082 A | 11/1984 | Bucknam |

(Continued)

FOREIGN PATENT DOCUMENTS

DE    828844    1/1952

(Continued)

OTHER PUBLICATIONS

Website, "LightSail Designs—Technologies", Oct. 2008.

(Continued)

*Primary Examiner* — Julio Gonzalez Ramirez

(57) ABSTRACT

An energy storage and recovery system employs air compressed utilizing power from an operating wind turbine. This compressed air is stored within one or more chambers of a structure supporting the wind turbine above the ground. By functioning as both a physical support and as a vessel for storing compressed air, the relative contribution of the support structure to the overall cost of the energy storage and recovery system may be reduced, thereby improving economic realization for the combined turbine/support apparatus. In certain embodiments, expansion forces of the compressed air stored within the chamber, may be relied upon to augment the physical stability of a support structure, further reducing material costs of the support structure.

20 Claims, 15 Drawing Sheets

U.S. PATENT DOCUMENTS

| | | | |
|---|---|---|---|
| 4,484,457 A | 11/1984 | Mugele | |
| 4,651,525 A | 3/1987 | Cestero | |
| 4,739,620 A | 4/1988 | Pierce | |
| 4,747,271 A | 5/1988 | Fischer | |
| 4,905,911 A | 3/1990 | Sakuma | |
| 5,027,602 A | 7/1991 | Glen et al. | |
| 5,076,067 A | 12/1991 | Prenger et al. | |
| 5,115,157 A | 5/1992 | Blumenau | |
| 5,121,607 A | 6/1992 | George, Jr. | |
| 5,169,295 A | 12/1992 | Stogner et al. | |
| 5,195,874 A | 3/1993 | Odagiri | |
| 5,214,921 A | 6/1993 | Cooley | |
| 5,404,937 A | 4/1995 | Assaf et al. | |
| 5,491,969 A | 2/1996 | Cohn et al. | |
| 5,537,822 A | 7/1996 | Shnaid et al. | |
| 5,537,974 A | 7/1996 | Palmer | |
| 5,616,007 A | 4/1997 | Cohen | |
| 5,634,340 A | 6/1997 | Grennan | |
| 5,638,684 A | 6/1997 | Siegel et al. | |
| 5,685,154 A | 11/1997 | Bronicki et al. | |
| 5,771,693 A | 6/1998 | Coney | |
| 5,832,728 A | 11/1998 | Buck | |
| 5,899,067 A | 5/1999 | Hageman | |
| 5,934,076 A | 8/1999 | Coney | |
| 6,145,311 A | 11/2000 | Cyphelly | |
| 6,206,660 B1 | 3/2001 | Coney et al. | |
| 6,323,332 B1 | 11/2001 | Fukuda et al. | |
| RE37,603 E | 3/2002 | Coney | |
| 6,449,940 B2 | 9/2002 | Nagel | |
| 6,516,603 B1 | 2/2003 | Urbach et al. | |
| 6,564,551 B1 | 5/2003 | Stock | |
| 6,607,361 B1 | 8/2003 | Kotter et al. | |
| 6,817,185 B2 | 11/2004 | Coney et al. | |
| 6,834,503 B2 | 12/2004 | Freymann | |
| 6,840,309 B2 | 1/2005 | Wilson et al. | |
| 6,858,953 B2 | 2/2005 | Stahlkopf | |
| 6,874,453 B2 | 4/2005 | Coney et al. | |
| 6,883,775 B2 | 4/2005 | Coney et al. | |
| 7,002,260 B2 | 2/2006 | Stahlkopf | |
| 7,073,335 B2 | 7/2006 | Gerdes et al. | |
| 7,086,231 B2 | 8/2006 | Pinkerton | |
| 7,140,182 B2 | 11/2006 | Warren | |
| 7,150,154 B2 | 12/2006 | Althaus et al. | |
| 7,398,841 B2 | 7/2008 | Kaufman | |
| 7,401,475 B2 | 7/2008 | Hugenroth et al. | |
| 7,432,611 B2 | 10/2008 | Stahlkopf | |
| 7,464,551 B2 | 12/2008 | Althaus et al. | |
| 7,469,527 B2 | 12/2008 | Negre et al. | |
| 7,566,992 B2 | 7/2009 | Althaus | |
| 7,612,466 B2 | 11/2009 | Skutt | |
| 7,614,237 B2 | 11/2009 | Nakhamkin | |
| 7,622,816 B2 | 11/2009 | Stahlkopf | |
| 7,640,643 B2 | 1/2010 | Nakhamkin | |
| 7,669,419 B2 | 3/2010 | Juby et al. | |
| 7,694,514 B2 | 4/2010 | Smith et al. | |
| 7,834,479 B2 | 11/2010 | Capp et al. | |
| 7,958,731 B2 | 6/2011 | Mcbride et al. | |
| 7,963,110 B2 | 6/2011 | Bollinger et al. | |
| 8,037,677 B2 | 10/2011 | Fong et al. | |
| 8,037,679 B2 | 10/2011 | Fong et al. | |
| 8,061,132 B2 | 11/2011 | Fong et al. | |
| 8,065,873 B2 | 11/2011 | Fong et al. | |
| 8,065,874 B2 | 11/2011 | Fong et al. | |
| 8,087,241 B2 | 1/2012 | Fong et al. | |
| 2001/0039795 A1 | 11/2001 | Nagel | |
| 2002/0128747 A1 | 9/2002 | Mima | |
| 2003/0180155 A1 | 9/2003 | Coney et al. | |
| 2004/0020528 A1 | 2/2004 | Patwardhan | |
| 2004/0244580 A1 | 12/2004 | Coney et al. | |
| 2005/0120715 A1 | 6/2005 | Labrador | |
| 2005/0126171 A1 | 6/2005 | Lasker | |
| 2005/0126176 A1 | 6/2005 | Fletcher et al. | |
| 2005/0178125 A1 | 8/2005 | Skinnes et al. | |
| 2005/0279296 A1 | 12/2005 | Coney et al. | |
| 2006/0248886 A1 | 11/2006 | Ma | |
| 2006/0266037 A1 | 11/2006 | Ingersoll | |
| 2007/0006586 A1 | 1/2007 | Hoffman et al. | |
| 2007/0095069 A1* | 5/2007 | Joshi et al. ............ 60/772 |
| 2007/0215723 A1 | 9/2007 | Moser et al. | |
| 2007/0295673 A1 | 12/2007 | Enis et al. | |
| 2008/0013253 A1 | 1/2008 | Thrap et al. | |
| 2008/0046387 A1 | 2/2008 | Gopal et al. | |
| 2008/0047271 A1 | 2/2008 | Ingersoll | |
| 2008/0050234 A1* | 2/2008 | Ingersoll et al. ......... 416/132 B |
| 2008/0155985 A1 | 7/2008 | Labrador | |
| 2008/0264062 A1 | 10/2008 | Prueitt | |
| 2009/0033102 A1 | 2/2009 | Enis et al. | |
| 2009/0038684 A1 | 2/2009 | Chatfield et al. | |
| 2009/0093916 A1 | 4/2009 | Parsonnet et al. | |
| 2009/0189456 A1 | 7/2009 | Skutt | |
| 2009/0205329 A1 | 8/2009 | Patwardhan | |
| 2009/0217666 A1 | 9/2009 | Farkaly | |
| 2009/0230696 A1 | 9/2009 | Enis et al. | |
| 2009/0281965 A9 | 11/2009 | Enis et al. | |
| 2009/0301089 A1 | 12/2009 | Bollinger | |
| 2009/0322084 A1 | 12/2009 | Hamilton | |
| 2010/0018196 A1 | 1/2010 | Li et al. | |
| 2010/0018247 A1 | 1/2010 | Enis et al. | |
| 2010/0037653 A1 | 2/2010 | Enis et al. | |
| 2010/0051003 A1 | 3/2010 | Negre et al. | |
| 2010/0089063 A1 | 4/2010 | Mcbride et al. | |
| 2010/0090532 A1 | 4/2010 | Shelton et al. | |
| 2010/0111713 A1 | 5/2010 | Chatfield et al. | |
| 2010/0127664 A1 | 5/2010 | Paice et al. | |
| 2010/0138058 A1 | 6/2010 | Kirchner et al. | |
| 2010/0205960 A1* | 8/2010 | Mcbride et al. ............ 60/641.2 |
| 2010/0257862 A1 | 10/2010 | Howes et al. | |
| 2010/0275634 A1 | 11/2010 | Okamoto et al. | |
| 2010/0307156 A1 | 12/2010 | Bollinger et al. | |
| 2010/0326062 A1 | 12/2010 | Fong et al. | |
| 2010/0326064 A1 | 12/2010 | Fong et al. | |
| 2010/0326066 A1 | 12/2010 | Fong et al. | |
| 2010/0326068 A1 | 12/2010 | Fong et al. | |
| 2010/0326069 A1 | 12/2010 | Fong et al. | |
| 2010/0326075 A1 | 12/2010 | Fong et al. | |
| 2010/0329891 A1 | 12/2010 | Fong et al. | |
| 2010/0329903 A1 | 12/2010 | Fong et al. | |
| 2010/0329909 A1 | 12/2010 | Fong et al. | |
| 2011/0023488 A1 | 2/2011 | Fong et al. | |
| 2011/0023977 A1 | 2/2011 | Fong et al. | |
| 2011/0030359 A1 | 2/2011 | Fong et al. | |
| 2011/0030552 A1 | 2/2011 | Fong et al. | |
| 2011/0056368 A1 | 3/2011 | Mcbride et al. | |
| 2011/0061741 A1 | 3/2011 | Ingersoll et al. | |
| 2011/0061836 A1 | 3/2011 | Ingersoll et al. | |
| 2011/0062166 A1 | 3/2011 | Ingersoll et al. | |
| 2011/0070031 A1 | 3/2011 | Frazier et al. | |
| 2011/0070032 A1 | 3/2011 | Frazier et al. | |
| 2011/0106321 A1 | 5/2011 | Cherian et al. | |
| 2011/0131966 A1 | 6/2011 | Mcbride et al. | |

FOREIGN PATENT DOCUMENTS

| | | |
|---|---|---|
| DE | 2000-314405 | 11/2000 |
| DE | 10151323 A1 | 1/2002 |
| EP | 0196690 B1 | 10/1989 |
| EP | 1783364 A2 | 9/2007 |
| ES | 2150833 A1 | 12/2000 |
| FR | 2229857 | 12/1974 |
| GB | 233078 | 5/1925 |
| GB | 1100983 | 1/1968 |
| GB | 1273537 | 5/1972 |
| GB | 2239489 A | 7/1991 |
| GB | 2376507 A | 12/2002 |
| JP | 52104644 A | 9/1977 |
| JP | 56-085527 | 7/1981 |
| JP | 58-155286 | 9/1983 |
| JP | 58155286 A | 9/1983 |
| JP | 63-115997 A | 5/1988 |
| JP | 4093559 A | 3/1992 |
| JP | 04-116348 A | 4/1992 |
| KR | 93-11547 | 6/1993 |
| KR | 1020080024497 A | 3/2008 |
| WO | WO 80/01301 | 6/1980 |
| WO | WO 87/03357 | 6/1987 |
| WO | WO 91/02885 | 3/1991 |
| WO | WO 93/06367 | 4/1993 |
| WO | WO 93/24754 | 12/1993 |

| | | |
|---|---|---|
| WO | WO 94/12785 | 6/1994 |
| WO | WO 98/16741 | 4/1998 |
| WO | WO 99/47803 A1 | 9/1999 |
| WO | WO 01/75278 A1 | 10/2001 |
| WO | WO 01/75283 A1 | 10/2001 |
| WO | WO 01/75290 A1 | 10/2001 |
| WO | WO 01/75308 A1 | 10/2001 |
| WO | WO 01/75383 A1 | 10/2001 |
| WO | WO 03/021107 A1 | 3/2003 |
| WO | WO 03/021702 A1 | 3/2003 |
| WO | WO 2004/022960 A1 | 3/2004 |
| WO | WO 2007/066117 A1 | 6/2007 |
| WO | WO 2007-066117 A1 | 6/2007 |
| WO | WO 2007/118282 A1 | 10/2007 |
| WO | WO 2007/120525 A2 | 10/2007 |
| WO | WO 2007/0140583 A1 | 12/2007 |
| WO | WO 2008/013870 A2 | 1/2008 |
| WO | WO 2008/022406 A1 | 2/2008 |
| WO | WO 2008/045468 A1 | 4/2008 |
| WO | WO 2008/064197 A2 | 5/2008 |
| WO | WO 2008/094058 A2 | 8/2008 |
| WO | WO 2008/139267 A1 | 11/2008 |
| WO | WO 2008/152432 A2 | 12/2008 |
| WO | WO 2008-152432 A2 | 12/2008 |
| WO | WO 2008/153716 A2 | 12/2008 |
| WO | WO 2009/034421 A1 | 3/2009 |
| WO | WO 2009/034548 A2 | 3/2009 |
| WO | WO 2009034421 A1 * | 3/2009 |
| WO | WO 2009/044139 A2 | 4/2009 |
| WO | WO 2009/061866 A2 | 5/2009 |
| WO | WO 2009/081171 A2 | 7/2009 |
| WO | WO 2009/114205 A2 | 9/2009 |
| WO | WO 2009/126784 A2 | 10/2009 |
| WO | WO 2010/054844 A2 | 5/2010 |
| WO | WO 2010/074589 A2 | 7/2010 |
| WO | WO 2010/128224 A1 | 11/2010 |
| WO | WO 2011/053402 A1 | 5/2011 |
| WO | WO 2011/056296 A2 | 5/2011 |
| WO | WO 2011/056303 A2 | 5/2011 |
| WO | WO 2011/056855 A1 | 5/2011 |

OTHER PUBLICATIONS

Website, "LightSail Designs—Frequently Asked Question", Oct. 2008.
Danielle Fong, "Tick Tock", Essays by Danielle Fong, Blog Entry, Nov. 2008.
Website, "How Hybrid Cars Work", How Stuff Works, <http://auto.howstuffworks.com/hybrid-car7.htm>, Feb. 4, 2010.
Website, "Wind Power to Compressed Air Energy Storage", After Gutenerg, <http://jcwinnie.biz/wordpress/?p=2115>.
The International Search Report for PCT/US2010/033795 filed May 5, 2010.
Written Opinion of the International Searching Authority for PCT/US2010/033795 filed on May 5, 2010.
U.S. Appl. No. 12/701,023, filed Feb. 5, 2010, Light Sail Energy Inc.
U.S. Appl. No. 12/701,039, filed Feb. 5, 2010, Light Sail Energy Inc.
U.S. Appl. No. 12/701,080, filed Feb. 5, 2010, Light Sail Energy Inc.
U.S. Appl. No. 12/701,146, filed Feb. 5, 2010, Light Sail Energy Inc.
U.S. Appl. No. 12/701,032, filed Feb. 5, 2010, Light Sail Energy Inc.
Website, "LightSail Designs—Frequently Asked Questions", Oct. 2008.
Flyer, "World Standard Gas Compressors", Ariel Corporation www.airlecorp.com.
"PJ Smallest Physical Size", www.BETE.com.
Linda Stuntz et al., "Bottling Electricity: Storage as a Strategic Tool for Managing Variability and Capacity Concerns in the Modern Grid: A Report by the Electricity Advisory Committee",EAC, Dec. 2008, Energetics Incorporated.
Linda Stuntz et al., "Smart Grid: Enabler of the New Energy Economy: A Report by the Electricity Advisory Committee", EAC, Dec. 2008, Energetics Incorporated.
Sylvain Lemofouet, "Energy Autonomy and Efficiency through Hydro-Pneumatic Storage", Enairys Power Tech.
Accelerated Examination Support Document for US 2010/0089063 A1 published on Apr. 15, 2010.

Akimichi Okimoto et al., "Grid Scale Applications of NAS Batteries around the World", 2010 ESA Annual Meeting, May 5, 2010, NGK Insulators, Ltd.
Mauro Pedretti, "Tensairity", European Congress on Computational Methods in Applied Sciences and Engineering (ECCOMAS) 2004, pp. 1-9, Airlight Ltd.
Franklin D. Jones, "Ingenious Mechanisms for Designers and Inventors vol. I", Copyright 1935, The Industustrial Press, New York City.
Franklin D. Jones, "Ingenious Mechanisms for Designers and Inventors vol. II", Copyright 1936, The Industrial Press, New York City.
John L. Lumley, "Engines: An Introduction", Sibley School of Mechanical and Aerospace Engineering, Cornell University, Using Version 2 of the Stanford Engine Simulation Program of W.C. Reynolds, 1999, pp. 66-74, Cambridge University Press.
P K Nag, "Engineering Thermodynamics", Second Edition, 1981, pp. 497-530, Tata McGraw-Hill Publishing Company Limited, New Delhi.
Allan J. Organ, "The Regenerator and the Stirling Engine", 1997, pp. 43-45, Mechanical Engineering Publications Limited, London.
Michael W. Coney et al., "Development of a Reciprocating Compressor Using Water Injection to Achieve Quasi-Isothermal Compression", Presented at the International Compressor Engineering Conference at Purdue, Jul. 16-19, 2002, pp. 1-8.
Maurice Stewart et al., "Gas-Liquid and Liquid-Liquid Separators", 2009, pp. 64-71, Elsevier, Gul Professional Publishing.
Charles Fayette Taylor, "The Internal-Combustion Engine in Theory and Proactice vol. I: Thermodynamics, Fluid Flow, Performance", Second Edition, 1960, The M.I.T. Press.
Charles Fayette Taylor, "The Internal-Combustion Engine in Theory and Practice vol. II: Combustion, Fuels, Materials, Design", Revised Edition, 1968, The M.I.T. Press.
Jim Eyer et al., "Energy Storage for the Electricity Grid: Benefits and Market Potential Assessment Guide: A Study for the Doe Energy Storage Systems Program", Sandia Report, SAND2010-0815, Unlimited Release, Printed Feb. 2010, Sandia National Laboratories.
Sylvain Lemofouet—GATSI, "Investigation and Optimisation of Hybrid Electricity Storage Systems Based on Compressed Air and Supercapacitors", These N 3628 (2006), Ecole Polytechnique Federale De Lausanne.
Danielle Fong, "How Law Shapes the Business Landscape, and a Patent Puzzle", Essays by Danille Fong, Blog Entry, Feb. 2010.
Cyrus B. Meher-Homji et al., "Inlet Fogging of Gas Turbine Engines Part A: Theory, Psychrometrics and Fog Generations.", Proceedings of ASME Turbo Expo 2000, Mar. 8-11, 2000, pp. 1-13, ASME, Munich.
"Cooling with Solar Heat: Growing Interest in Solar Air Conditioning", SolarServer Online Portal to Solar Energy, http://www.solarserver.com/solarmagazine/artikeljuni2002-e.html.
K Friedrich et al., "Wear of polymer composites", Proc Instn Mech Engrs. 2002, pp. 415-426, vol. 216, Part J: J Engineering Tribology, IMechE.
K kato et al., "Classification of wear mechanisms/ models", Proc Instn Mech Engrs, 2002, pp. 349-355, vol. 216, Part J: J Engineering Tribology, IMechE.
B. Szeptycka et al., "Tribological Properties of the Nanostructural of the Nanostructural Electroplated Composite Coatings", International Conference on Tribology, Sep. 20-22, 2006, AITC-AIT, Parma, Italy.
S. Nonnenmacher et al., "Design of hollow cone pressure swirl nozzels to atomize Newtonian fluids", Chemical Engineering Science, 2000, pp. 4339-4348, vol. 55, Elsevier Science Ltd.
Uli Jakob, "Cool Climate from the scortching sun", Solar Thermal, Feb. 2008, pp. 64-70, 27, Sun & Wind Energy.
Rudolf J. Schick et al., "Spray Characterization for Wet Compression Gas Cooling Applications", Eighth International Conference on Liquid Atomization and Spray Systems, Jul. 2000, Spraying Systems Co., USA.
H. Unal et al., "Friction and wear performance of some thermoplastic polymers and polymer composites against unsaturated polyester", Applied Surface Science, 2006, pp. 8139-8146, vol. 252, Elsevier B.V.
The International Search Report for PCT/US2010/031915 filed on Apr. 21, 2010.

Written Opinion of the International Searching Authority for PCT/US2010/031915 filed on Apr. 21, 2010.
Website, "How Hybrid Cars Work", How Stuff Wors, <http://auto.howstuffworks.com/hybrid-car7.htm>, Feb. 4, 2010.
Website, "Wind Power to Compressed Air Energy Storage", After Gutenberg, <http://jcwinnie.biz/wordpress/?=2115>.
The International Search Report for PCT/US2010/033795 filed on May 5, 2010.
Jason James Hugenroth, "Liquid Flooded Ericsson Cycle Cooler", Thesis Dissertation, Purdue University, May 2006, West Lafayette, Indiana.
Giuseppe Grazzini et al, "Energy Analysis of a Caes With Thermal Energy Storage", Universitá di Firenze, Italy.
Written Opinion of the International Searching Authority for application PCT/US2010/040240 filed on Jun. 28, 2010.
International Search Report for application PCT/US2010/040240 filed on Jun. 28, 2010.
Andrew Goodwin et al., "Improving PUE with the Use of Battery-Free UPS", Compressed Air, Rotary, Diesel, UPS—Introducing Air-DRUPS™, Jan. 7, 2011.
Johan Beukes et al., "Suitability of compressed air energy storage technology for electricity utility standby power applications", Jan. 3, 2010.
Tim Probert, "Pnu tricks: compressed air energy storage", Power Engineering.International, Sep. 1, 2009. Website:.http://www.powergenworldwide.com/index/display/articledisplay/369242/articles/power-en.

Notice of Allowance and List of References cited by the Examiner for U.S. Appl. No. 12/868,701 mailed Jun. 14, 2011 from the United States Patent and Trademark Office.
Notice of Allowance and List of References cited by the Examiner for U.S. Appl. No. 12/868,695 mailed Jun. 8, 2011 from the United States Patent and Trademark Office.
Preliminary Amendment for U.S. Appl. No. 12/938,853, filed Dec. 2, 2010 to the United States Patent and Trademark Office.
Preliminary Amendment for U.S. Appl. No. 13/026,677, filed Mar. 23, 2011 to the United States Patent and Trademark Office.
Notice of Allowance and List of References cited by the Examiner for U.S. Appl. No. 12/701,146 mailed Dec. 28, 2011 from the United States Patent and Trademark Office.
Notice of Allowance and List of References cited by the Examiner for U.S. Appl. No. 12/868,683 mailed Dec. 21, 2011 from the United States Patent and Trademark Office.
Notice of Allowance and List of References cited by the Examiner for U.S. Appl. No. 12/868,705 mailed Dec. 13, 2011 from the United States Patent and Trademark Office.
Notice of Allowance and List of References cited by the Examiner for U.S. Appl. No. 12/823,944 mailed Jan. 9, 2012 from the United States Patent and Trademark Office.

* cited by examiner

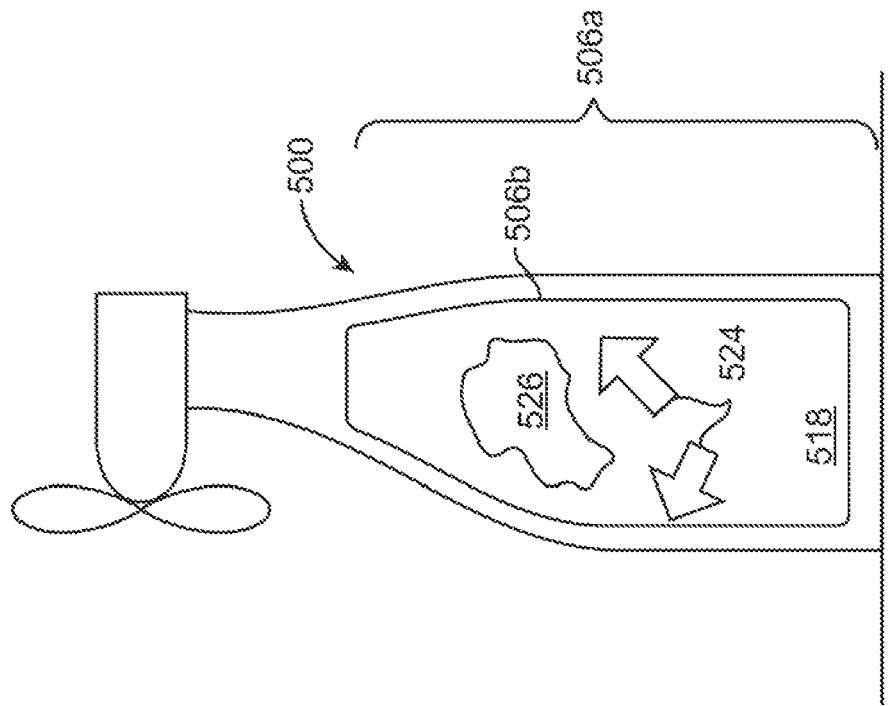
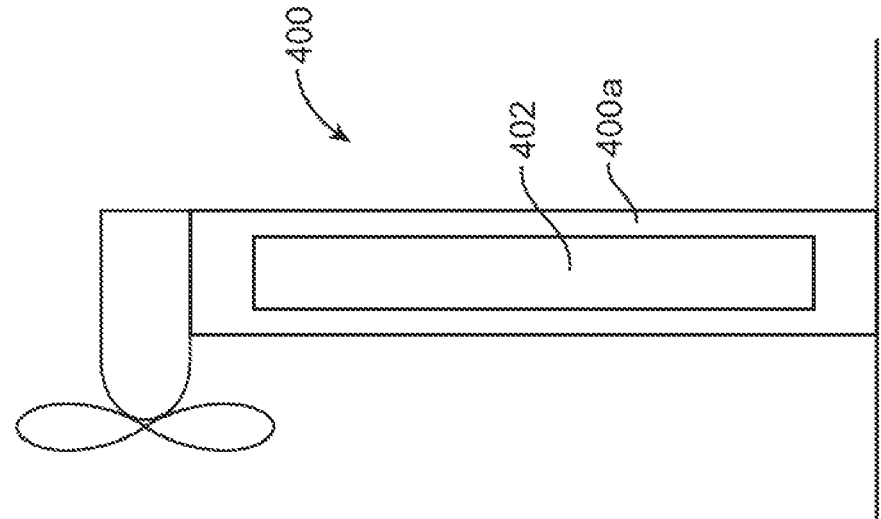
FIG. 5
FIG. 4

ENERGY STORAGE SYSTEM UTILIZING COMPRESSED GAS

BACKGROUND

Air compressed to 300 bar has energy density comparable to that of lead-acid batteries and other energy storage technologies. One source of compressed air is wind.

It is known that the efficiency of power generation from wind, improves with increased height of elevation of the fan blades of the wind turbine from the ground. Such elevation, however, requires provision of a large, fixed structure of sufficient mechanical strength to safely support the relatively heavy structure of the turbine, including the blades, under a variety of wind conditions.

The expense of constructing and maintaining such a support structure is an inherent expense of the system, detracting from the overall profitability of the wind generation device. Accordingly, there is a need in the art for novel structures and methods for supporting a wind turbine.

SUMMARY

An energy storage and recovery system employs air compressed utilizing power from an operating wind turbine. This compressed air is stored within one or more chambers of a structure supporting the wind turbine above the ground. By functioning as both a physical support and as a vessel for storing compressed air, the relative contribution of the support structure to the overall cost of the energy storage and recovery system may be reduced, thereby improving economic realization for the combined turbine/support apparatus. In certain embodiments, expansion forces of the compressed air stored within the chamber may be relied upon to augment the physical stability of a support structure, further reducing material costs of the support structure.

An embodiment of a method in accordance with the present invention comprises storing compressed gas generated from power of an operating wind turbine, within a chamber defined by walls of a structure supporting the wind turbine.

An embodiment of an apparatus in accordance with the present invention comprises a support structure configured to elevate a wind turbine above the ground, the support structure comprising walls defining a chamber configured to be in fluid communication with a gas compressor operated by the wind turbine, the chamber also configured to store gas compressed by the compressor.

An embodiment of an apparatus in accordance with the present invention comprises an energy storage system comprising a wind turbine, a gas compressor configured to be operated by the wind turbine, and a support structure configured to elevate the wind turbine above the ground, the support structure comprising walls defining a chamber in fluid communication with the gas compressor, the chamber configured to store gas compressed by the gas compressor. A generator is configured to generate electrical power from expansion of compressed gas flowed from the chamber.

BRIEF DESCRIPTION OF THE DRAWINGS

FIG. 1AA shows a simplified cross-sectional view of the planetary gear system of FIG. 1A taken along line 1A-1A'.

FIG. 4 is a simplified schematic representation of an alternative embodiment of a system in accordance with the present invention.

FIG. 5 is a simplified schematic representation of an alternative embodiment of a system in accordance with the present invention.

DETAILED DESCRIPTION

As previously described, a wind turbine operates to capture wind energy more effectively the higher it is elevated above the ground. In particular, wind speed is roughly proportional to the seventh root of the height. Power is proportional to the cube of the wind speed, and also proportional to the area of the wind turbine. A greater height, H, could theoretically allow a larger diameter turbine, giving area proportional to $H^2$ and power proportional to $H^x$, with x perhaps as great as $2\frac{3}{7}$. The support structure is thus a necessary element of the system. According to embodiments of the present invention, this support structure can perform the further duty of housing one or more chambers or vessels configured to receive and store compressed air generated from output of the wind turbine.

Such a support structure for a wind turbine is initially well suited for this task, as it is typically formed from an exterior shell that encloses an interior space. This structure provides the desired mechanical support for the wind turbine at the top, while not consuming the large amount of material and avoiding the heavy weight that would otherwise be associated with an entirely solid supporting structure.

Figure 1:
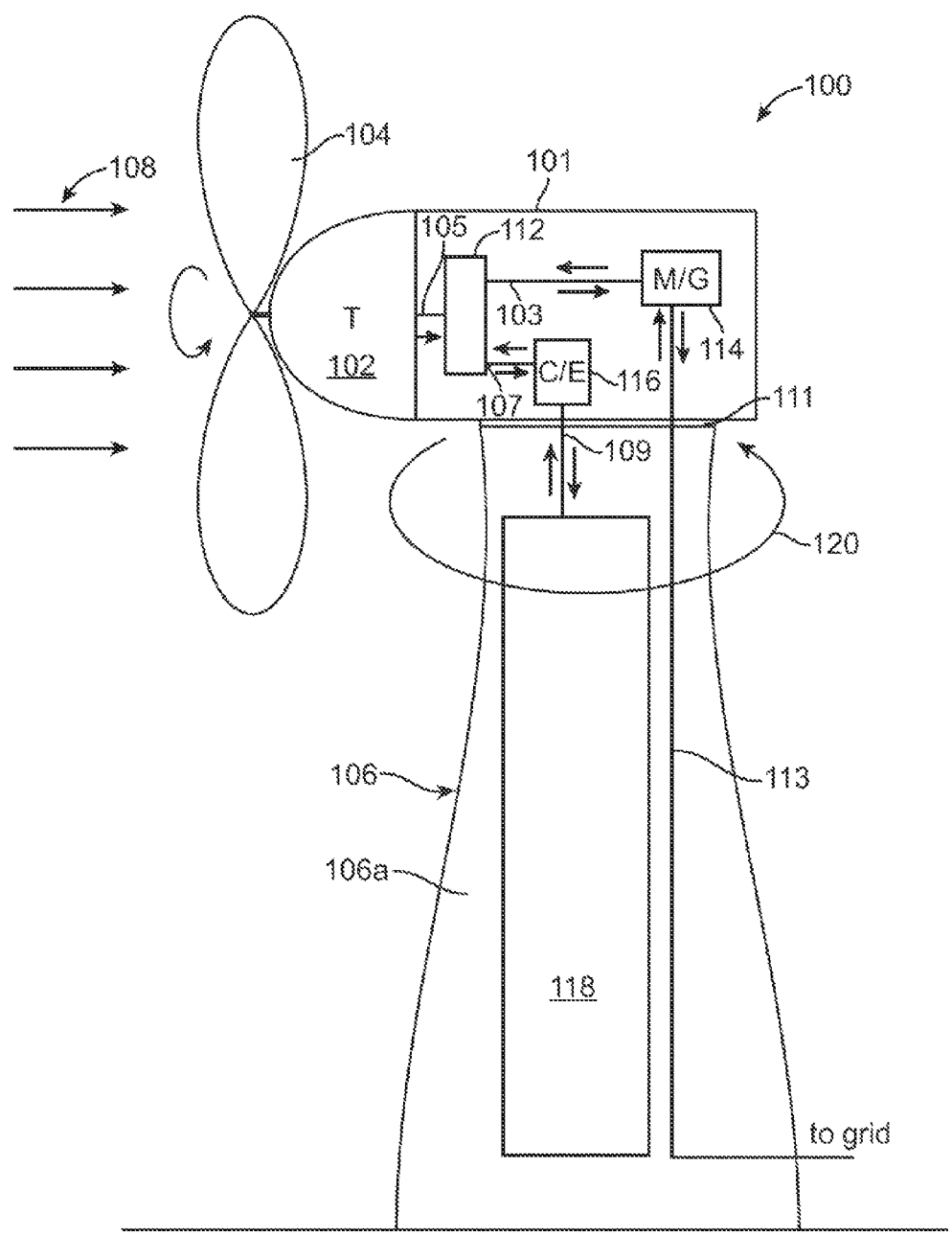
FIG. 1 is a simplified schematic representation of an embodiment of a system in accordance with the present invention.

FIG. 1 shows a simplified schematic view of an embodiment of a system in accordance with the present invention. Specifically, system 100 comprises a nacelle 101 that is positioned on top of support tower 106. Nacelle 101 includes a wind turbine 102 having rotatable blades 104.

Nacelle 101 may be in rotatable communication (indicated by arrow 120) with support tower 106 through joint 111, thereby allowing the blades of the wind turbine to be oriented to face the direction of the prevailing wind. An example of a wind turbine suitable for use in accordance with embodiment of the present invention is the model 1.5 sle turbine available from the General Electric Company of Fairfield, Conn.

Upon exposure to wind 108, the blades 104 of the turbine 102 turn, thereby converting the power of the wind into energy that is output on linkage 105. Linkage 105 may be mechanical, hydraulic, or pneumatic in nature.

Linkage 105 is in turn in physical communication with a motor/generator 114 through gear system 112 and linkage 103. Gear system 112 is also in physical communication with compressor/expander element 116 through linkage 107. Linkages 103 and 107 may be mechanical, hydraulic, or pneumatic in nature.

The gear system may be configured to permit movement of all linkages at the same time, in a subtractive or additive manner. The gear system may also be configured to accommodate movement of fewer than all of the linkages. In certain embodiments, a planetary gear system may be well-suited to perform these tasks.

Compressed gas storage chamber 118 is defined within the walls 118a of the support tower. Compressor/expander 116 is in fluid communication with storage chamber 118 through conduit 109.

Several modes of operation of system 100 are now described. In one mode of operation, the wind is blowing, and demand for power on the grid is high. Under these conditions, substantially all of the energy output from rotation of the blades of the turbine, is communicated through linkages 105 and 103 and gear system 112 to motor/generator 114 that is acting as a generator. Electrical power generated by motor/generator 114 is in turn communicated through conduit 113 to be output onto the grid for consumption. The compressor/expander 116 is not operated in this mode.

In another mode of operation, the wind is blowing but demand for power is not as high. Under these conditions, a portion of the energy output from rotation of the blades of the turbine is converted into electrical power through elements 105, 112, 103, and 114 as described above.

Moreover, some portion of the energy output from the operating turbine is also communicated through linkages 105 and 107 and gear system 112 to operate compressor/expander 116 that is functioning as a compressor. Compressor/expander 116 functions to intake air, compress that air, and then flow the compressed air into the storage chamber 118 located in the support tower. As described below, energy that is stored in the form of this compressed air can later be recovered to produce useful work.

Specifically, in another mode of operation of system 100, the compressor/expander 116 is configured to operate as an expander. In this mode, compressed air from the storage chamber is flowed through conduit 109 into the expander 116, where it is allowed to expand. Expansion of the air drives a moveable element that is in physical communication with linkage 107. One example of such a moveable element is a piston that is positioned within a cylinder of the compressor/expander 116.

The energy of actuated linkage 107 is in turn communicated through gear system 112 and linkage 103 to motor/generator 114 that is acting as a generator. Electrical power generated by motor/generator as a result of actuation of linkage 103, may in turn be output to the power grid through conduit 113.

In the mode of operation just described, the wind may or may not be blowing. If the wind is blowing, the energy output by the compressor/expander 116 may be combined in the gear system with the energy output by the turbine 112. The combined energy from these sources (wind, compressed air) may then be communicated by gear system 112 through linkage 103 to motor/generator 114.

In still another mode of operation, the wind may not be blowing and power demand is low. Under these conditions, the compressor/expander 116 may operate as a compressor. The motor/generator 114 operates as a motor, drawing power off of the grid to actuate the compressor/expander 116 (functioning as a compressor) through linkages 103 and 107 and gear system 112. This mode of operation allows excess power from the grid to be consumed to replenish the compressed air stored in the chamber 118 for consumption at a later time.

Embodiments of systems which provide for the efficient storage and recovery of energy as compressed gas, are described in the U.S. Provisional Patent Application No. 61/221,487 filed Jun. 29, 2009, and in the U.S. nonprovisional patent application Ser. No. 12/695,922 filed Jan. 28, 2010, both of which are incorporated by reference in their entireties herein for all purposes. However, embodiments of the present invention are not limited to use with these or any other particular designs of compressed air storage and recovery systems. Also incorporated by reference in its entirety herein for all purposes, is the provisional patent application no. 61/294,396, filed Jan. 12, 2010.

As previously mentioned, certain embodiments of the present invention may favorably employ a planetary gear system to allow the transfer of mechanical energy between different elements of the system. In particular, such a planetary gear system may offer the flexibility to accommodate different relative motions between the linkages in the various modes of operation described above.

Figure 1A:
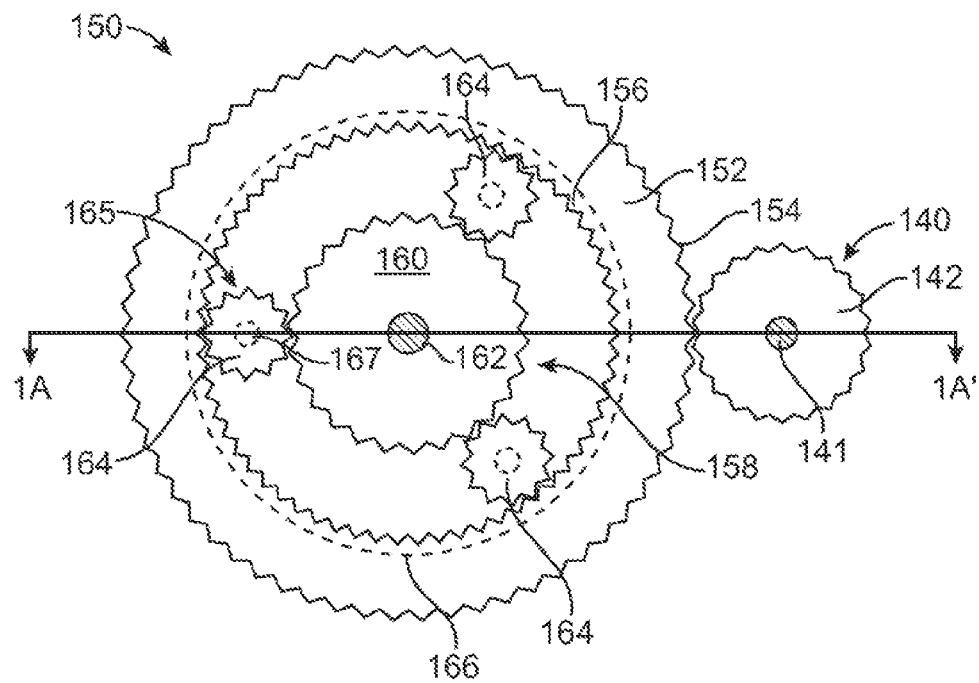
FIG. 1A shows a simplified top view of one embodiment of a planetary gear system which could be used in embodiments of the present invention.
Figure 1A:
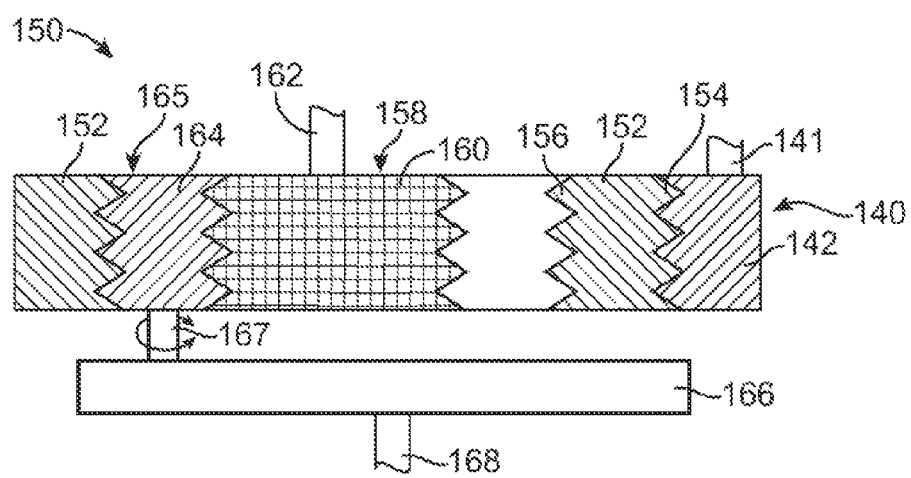

FIG. 1A shows a simplified top view of one embodiment of a planetary gear system which could be used in embodiments of the present invention. FIG. 1AA shows a simplified cross-sectional view of the planetary gear system of FIG. 1A taken along line 1A-1A'.

Specifically, planetary gear system 150 comprises a ring gear 152 having a first set of teeth 154 on an outer periphery, and having a second set of teeth 156 on an inner portion. Ring gear 152 is engaged with, and moveable in either direction relative to, three other gear assemblies.

In particular, first gear assembly 140 comprises side gear 142 that is positioned outside of ring gear 152, and is fixed to rotatable shaft 141 which serves as a first linkage to the planetary gear system. The teeth of side gear 142 are in mechanical communication with the teeth 154 located on the outer periphery of the ring gear. Rotation of shaft 141 in either direction will translate into a corresponding movement of ring gear 152.

A second gear assembly 158 comprises a central (sun) gear 160 that is positioned inside of ring gear 152. Central gear 160 is fixed to rotatable shaft 162 which serves as a second linkage to the planetary gear system.

Third gear assembly 165 allows central gear 160 to be in mechanical communication with the second set of teeth 156 of ring gear 152. In particular, third gear assembly 165 comprises a plurality of (planet) gears 164 that are in free rotational communication through respective pins 167 with a (planet carrier) plate 166. Plate 166 is fixed to a third shaft 168 serving as a third linkage to the planetary gear system.

The planetary gear system 150 of FIGS. 1A-1AA provides mechanical communication with three rotatable linkages 141, 162, and 168. Each of these linkages may be in physical communication with the various other elements of the system, for example the wind turbine, a generator, a motor, a motor/generator, a compressor, an expander, or a compressor/expander.

The planetary gear system 150 permits movement of all of the linkages at the same time, in a subtractive or additive manner. For example where the wind is blowing, energy from the turbine linkage may be distributed to drive both the linkage to a generator and the linkage to a compressor. In another example, where the wind is blowing and demand for energy is high, the planetary gear system permits output of the turbine linkage to be combined with output of an expander linkage, to drive the linkage to the generator.

Moreover, the planetary gear system is also configured to accommodate movement of fewer than all of the linkages. For example, rotation of shaft 141 may result in the rotation of shaft 162 or vice-versa, where shaft 168 is prevented from rotating. Similarly, rotation of shaft 141 may result in the rotation of only shaft 168 and vice-versa, or rotation of shaft 162 may result in the rotation of only shaft 168 and vice-versa. This configuration allows for mechanical energy to be selectively communicated between only two elements of the system, for example where the wind turbine is stationary and it is desired to operate a compressor based upon output of a motor.

Returning to FIG. 1, certain embodiments of compressed gas storage and recovery systems according to the present invention may offer a number of potentially desirable characteristics. First, the system leverages equipment that may be present in an existing wind turbine system. That is, the compressed air energy storage and recovery system may utilize the same electrical generator that is used to output power from the wind turbine onto the grid. Such use of the generator to generate electrical power both from the wind and from the stored compressed air, reduces the cost of the overall system.

Another potential benefit associated with the embodiment of FIG. 1 is improved efficiency of power generation. Specifically, the mechanical energy output by the rotating wind turbine blades, is able to be communicated in mechanical form to the compressor without the need for conversion into another form (such as electrical energy). By utilizing the output of the power source (the wind turbine) in its native mechanical form, the efficiency of transfer of that power into compressed air may be enhanced.

Still another potential benefit associated with the embodiment of FIG. 1 is a reduced number of components. In particular, two of the elements of the system perform dual functions. Specifically, the motor/generator can operate as a motor and as a generator, and the compressor/expander can operate as a compressor or an expander. This eliminates the need for separate, dedicated elements for performing each of these functions.

Still another potential benefit of the embodiment of FIG. 1 is relative simplicity of the linkages connecting various elements with moving parts. Specifically, in the embodiment of FIG. 1, the turbine, the gear system, the motor/generator, and the compressor/expander are all located in the nacelle. Such a configuration offers the benefit of compatibility with a rotational connection between a nacelle and the underlying support structure. In particular, none of the linkages between the elements needs to traverse the rotating joint, and thus the linkages do not need to accommodate relative motion between the nacelle and support structure. Such a configuration allows the design and operation of those linkages to be substantially simplified.

Figure 2:
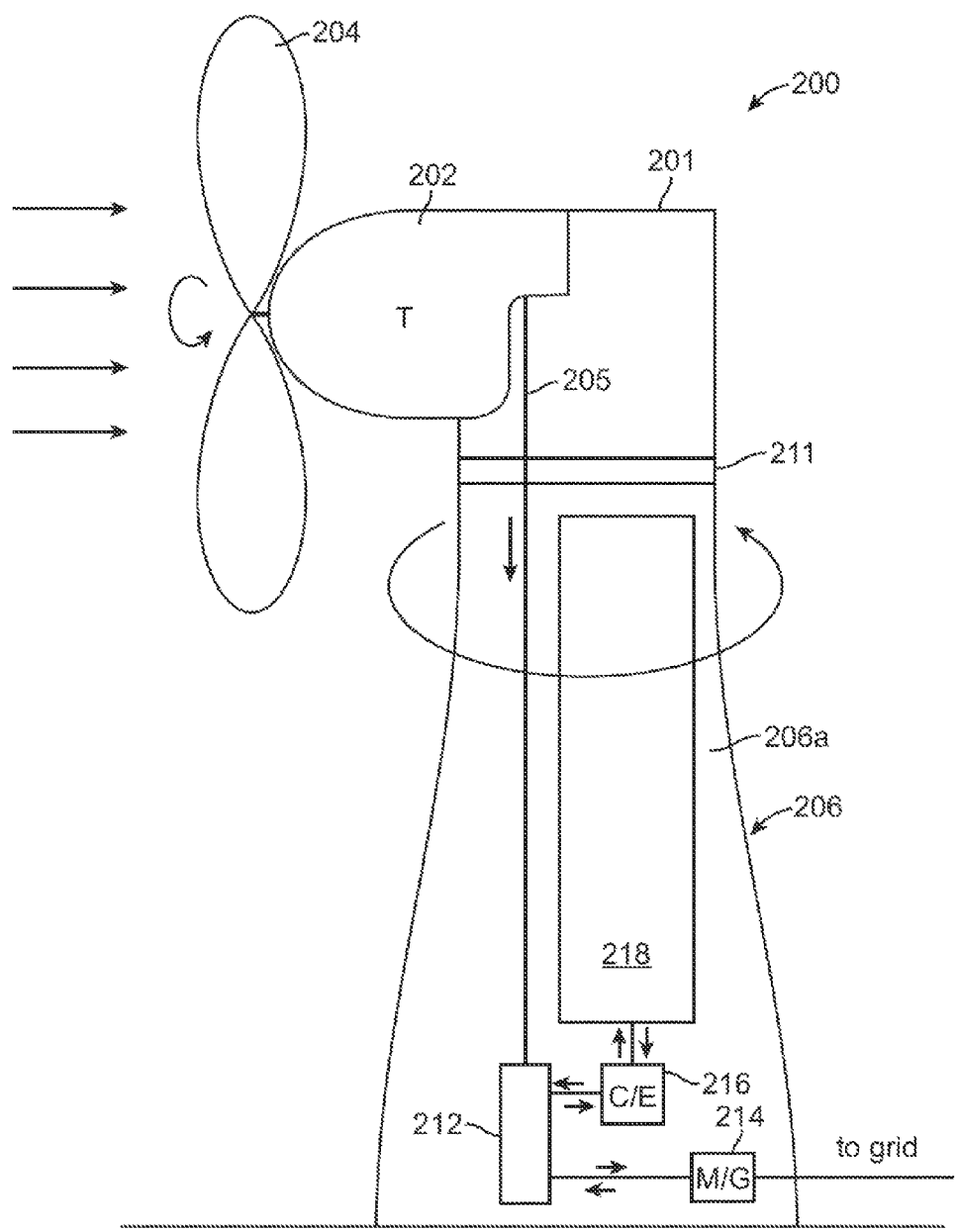
FIG. 2 is a simplified schematic representation of an alternative embodiment of a system in accordance with the present invention.

According to alternative embodiments, however, one or more of the gear system, the compressor/expander, and the motor/generator may be positioned outside of the nacelle. FIG. 2 shows a simplified view of such an alternative embodiment of a system 200 in accordance with the present invention.

In this embodiment, while the turbine 202 is positioned in the nacelle 201, the gear system 212, compressor/expander 216, and motor generator 214 are located at the base of the tower 206. This placement is made possible by the use of an elongated linkage 205 running between turbine 202 and gear system 212. Elongated linkage 205 may be mechanical, hydraulic, or pneumatic in nature.

The design of the embodiment of FIG. 2 may offer some additional complexity, in that the linkage 205 traverses rotating joint 211 and accordingly must be able to accommodate relative motion of the turbine 202 relative to the gear system 212. Some of this complexity may be reduced by considering that linkage 205 is limited to communicating energy in only one direction (from the turbine to the gear system).

Moreover, the cost of complexity associated with having linkage 205 traverse rotating joint 211, may be offset by the ease of access to the motor/generator, compressor/expander, and gear system. Specifically, these elements include a large number of moving parts and are subject to wear. Positioning these elements at the base of the tower (rather than at the top) facilitates access for purposes of inspection and maintenance, thereby reducing cost.

Still other embodiments are possible. For example, while FIG. 2 shows the gear system, motor/generator, and compressor/expander elements as being housed within the support structure, this is not required. In other embodiments, one or more of these elements could be located outside of the support structure, and still communicate with the wind turbine through a linkage extending from the support tower. In such embodiments, conduits for compressed air and for electricity, and mechanical, hydraulic, or pneumatic linkages could provide for the necessary communication between system elements.

Embodiments of the present invention are not limited to the particular elements described above. For example, while FIGS. 1 and 2 show compressed gas storage system comprising compressor/expander elements and motor/generator elements having combined functionality, this is not required by the present invention.

Figure 3:
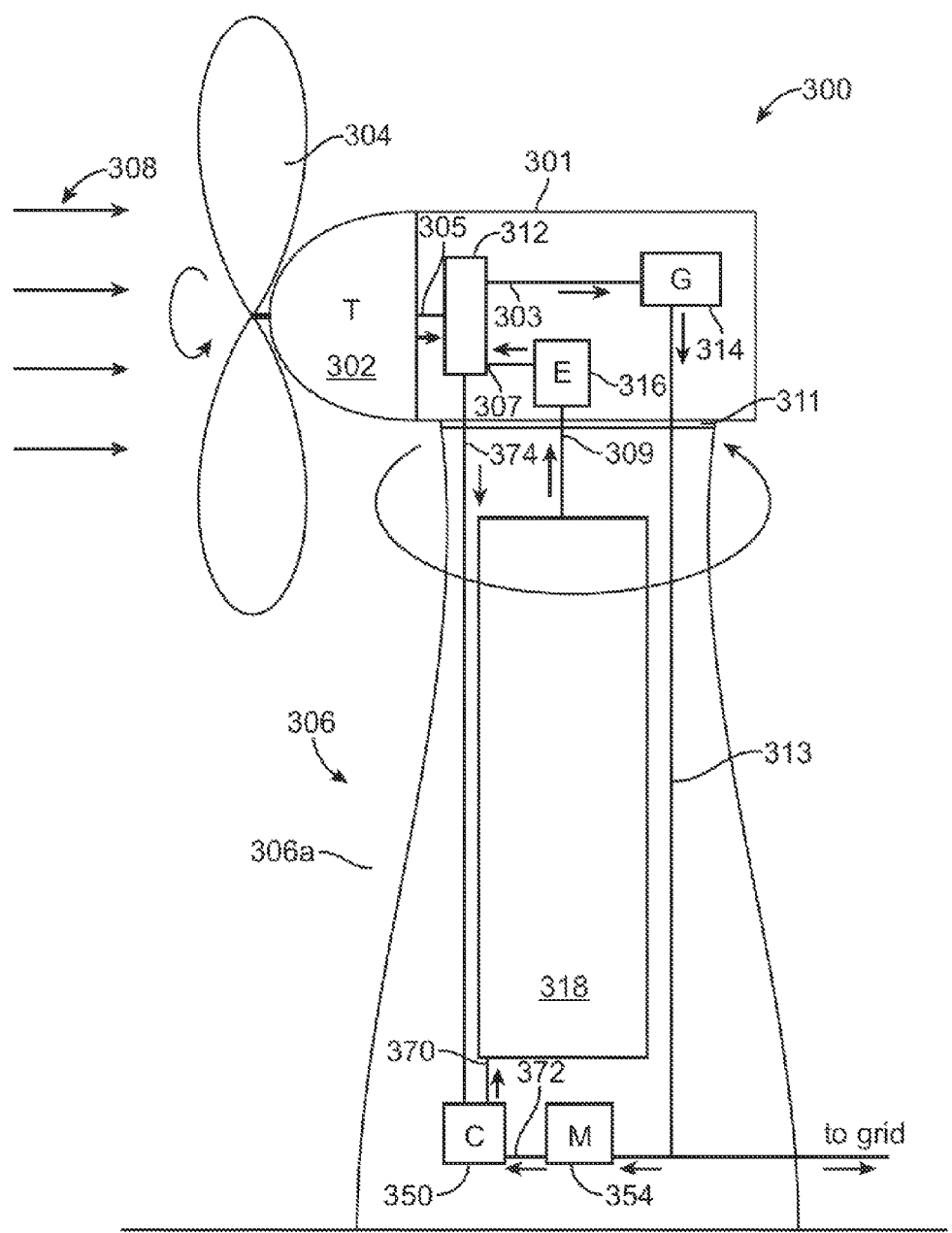
FIG. 3 is a simplified schematic representation of an alternative embodiment of a system in accordance with the present invention.

FIG. 3 shows an alternative embodiment a system 300 according to the present invention, utilizing separate, dedicated compressor 350, dedicated expander 316, dedicated motor 354, and dedicated generator 314 elements. Such an embodiment may be useful to adapt an existing wind turbine to accommodate a compressed gas storage system.

Specifically, pre-existing packages for wind turbines may feature the dedicated generator element 314 in communication with the turbine 302 through gear system 312 and linkages 303 and 305. Generator 314, however, is not designed to also exhibit functionality as a motor.

To such an existing configuration, a dedicated expander 316, a dedicated compressor 350, a dedicated motor 354, linkages 307 and 373, and conduit 370 may be added to incorporate a compressed gas storage system. In one embodiment, a dedicated expander 316 may be positioned in the nacelle 301 in communication with the gear system 312 through linkage 307. Dedicated expander 316 is in fluid communication with a top portion of the compressed gas storage chamber 318 defined within the walls 306a of support tower 306 through conduit 309.

Dedicated compressor 350 and a dedicated motor 354 are readily included, for example at or near the base of the support tower, thereby facilitating access to these elements. Dedicated compressor 350 is in fluid communication with storage chamber 318 through conduit 370, and in physical communication with dedicated motor 354 through linkage 372. Dedicated motor 354 is in turn in electronic communication with the generator and/or grid to receive power to operate the compressor to replenish the supply of compressed gas stored in the chamber 318.

As shown in FIG. 3, this embodiment may further include an optional elongated mechanical, hydraulic, or pneumatic linkage 374 extending between the gear system 312 in the nacelle 301, and the dedicated compressor 350 located outside of the nacelle 301. Such a linkage would allow the dedicated compressor to be directly operated by the output of the turbine, avoiding losses associated with converting mechanical into electrical form by the dedicated generator, and re-converting the electrical power back into mechanical form by the dedicated motor in order to operate the compressor.

Figure 3A:
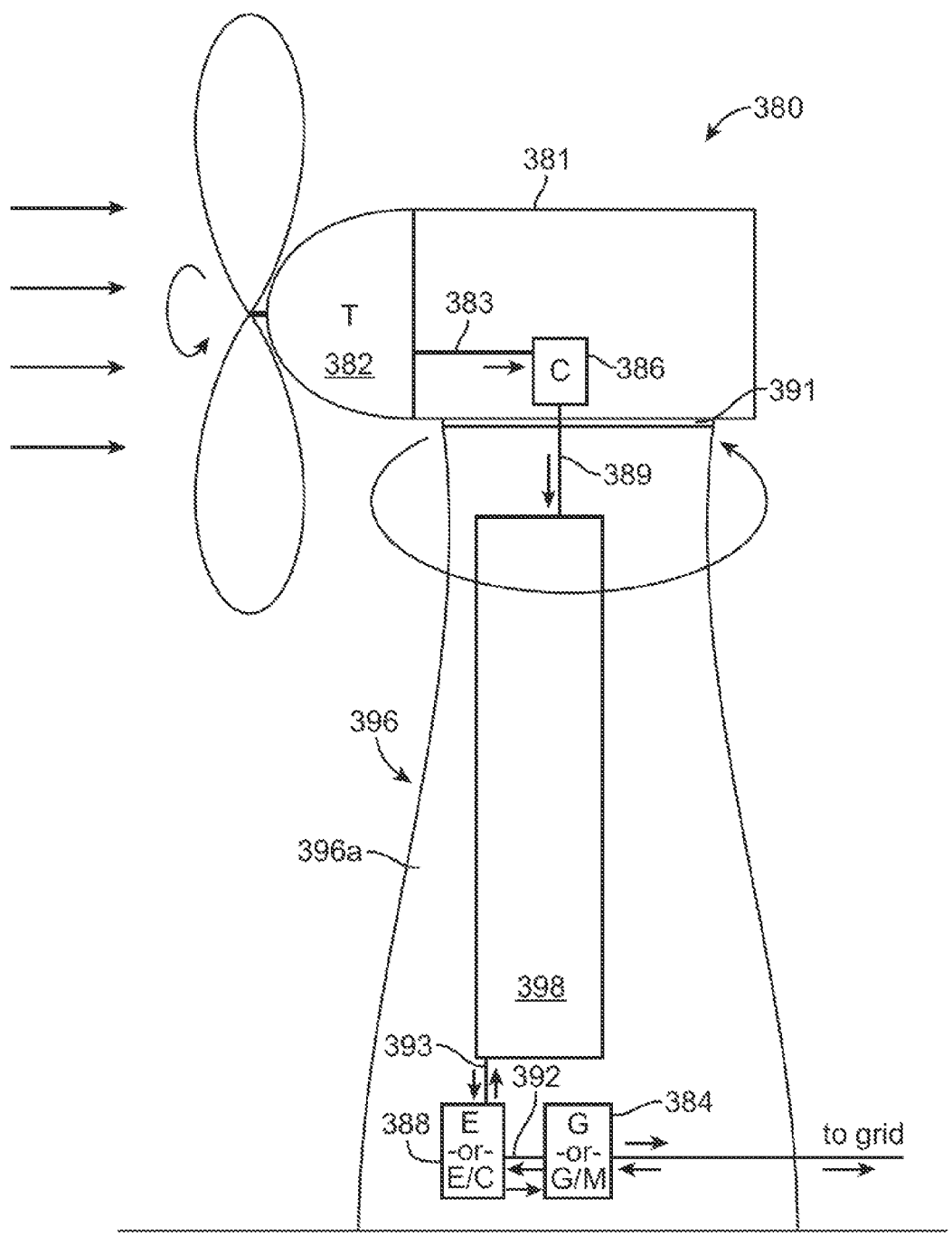
FIG. 3A is a simplified schematic representation of an alternative embodiment of a system in accordance with the present invention.

FIG. 3A shows a simplified view of yet another embodiment of a system in accordance with the present invention. In the embodiment of the system 380 of FIG. 3A, only the turbine 382, linkage 383, and dedicated compressor 386 elements are located in the nacelle 381 that is positioned atop support tower 396. Dedicated compressor 386 is in communication with the turbine through linkage 383 (which may be mechanical, hydraulic, or pneumatic), which serves to drive compression of air by the dedicated compressor. Compressed air output by the dedicated compressor is flowed through conduit 389 across joint 391 into chamber 398 present in the support tower 396.

The remaining elements are positioned outside of the nacelle, either in the support tower, or alternatively outside of the support tower. For example, a dedicated expander or expander/compressor 388 is in communication with the chamber 398 defined within walls 396a, to receive compressed air through conduit 393. Element 388 is configured to allow expansion of the compressed air, and to communicate energy recovered from this expansion through linkage 392 to generator or generator/motor 384. Element 384 in turn operates to generate electricity that is fed onto the grid.

The embodiment of FIG. 3A can also function to store energy off of the grid. Where element 384 is a generator/motor and element 388 is an expander/compressor, element 384 may operate as a motor to drive element 388 operating as a compressor, such that air is compressed and flowed into chamber 398 for storage and later recovery.

The embodiment of FIG. 3A offers a potential advantage in that power is transported from the top to the bottom of the tower utilizing the chamber, without requiring a separate elongated linkage or conduit. Another possible advantage of the embodiment of FIG. 3A is a reduction in the weight at the top of the tower. While this embodiment may incur losses where the mechanical power output of the turbine is converted first into compressed air and then back into mechanical power for driving the generator, such losses may be offset by a reduction in weight at the top of the tower, allowing the tower to be higher and to access more wind power.

The present invention is not limited to a support structure having any particular shape. In the particular embodiments shown in FIGS. 1 and 2, the support structure exhibits a cross-sectional shape that varies along its length. For example, the support structure 106 is wide at its base, and then tapers to a point at which it meets the wind turbine. By allocating material to where it will best serve the supporting function, such a design minimizes materials and reduces cost.

However, the present invention also encompasses supporting structures having other shapes. For example, FIG. 4 shows a support structure 400 comprising a hollow tube having a circular or elliptical cross section that is substantially uniform. The walls 400a of this hollow tube 400 in turn define a chamber 402 for storing compressed gas. While possibly utilizing more mass, such a tube is a simpler structure that is employed for a various applications in many other industries. Accordingly, such a tube is likely available at a relatively low price that may offset any greater material cost.

Still further alternative embodiments are possible. For example, in certain embodiments a support structure may be designed to take advantage of the forces exerted by the compressed air stored therein, in order to impart additional stability to the support structure.

Thus, FIG. 5 shows an embodiment wherein the support structure 500 comprises a portion 506a having thinner walls 506b exhibiting less inherent strength than those of the prior embodiments. This reduced strength may be attributable to one or more factors, including but not limited to, use of a different design or shape for the support, use of a reduced amount of material in the support, or use of a different material in the support.

According to embodiments of the present invention, however, any reduction in the inherent strength of the support structure 506 may be offset by expansion forces 524 exerted by the compressed air 526 that is contained within the chamber 518. Specifically, in a manner analogous to the stiffening of walls of an inflated balloon, the expansion force of the compressed air may contribute additional strength to the support structure. This expansion effect is shown grossly exaggerated in FIG. 5, for purposes of illustration.

One possible application for such a design, employs a support structure that is fabricated from a material that is capable of at least some flexion, for example carbon fiber. In such an embodiment, expansion forces from the compressed air within the chamber of a flexible support member, may act against the walls of the chamber, thereby stiffening it and contributing to the structural stability of that support. Such a support structure could alternatively be formed from other materials, and remain within the scope of the present invention.

A design incorporating carbon fiber could offer even further advantages. For example, carbon fiber structures may exhibit enhanced strength in particular dimensions, depending upon the manner of their fabrication. Thus, a carbon fiber support structure could be fabricated to exhibit strength and/or flexion in particular dimensions, for example those in which the expansion forces of the compressed air are expected to operate, and/or dimension in which the support is expected to experience external stress (e.g. a prevailing wind direction).

Of course, a design taking advantage of expansion forces of the stored compressed air, would need to exhibit sufficient inherent strength in the face of expected (and unexpected) changes in the quantity of compressed air stored therein, as that compressed air is drawn away and allowed to expand for energy recovery. Nevertheless, expansion forces associated with minimal amounts of compressed air remaining within the support structure, could impart sufficient stability to support structure to reduce its cost of manufacture and maintenance.

Embodiments of the present invention relate generally to energy storage systems, and more particularly, relates to energy storage systems that utilize compressed air as the energy storage medium, comprising an air compression/expansion mechanism, a heat exchanger, and one or more air storage tanks.

Figure 6:
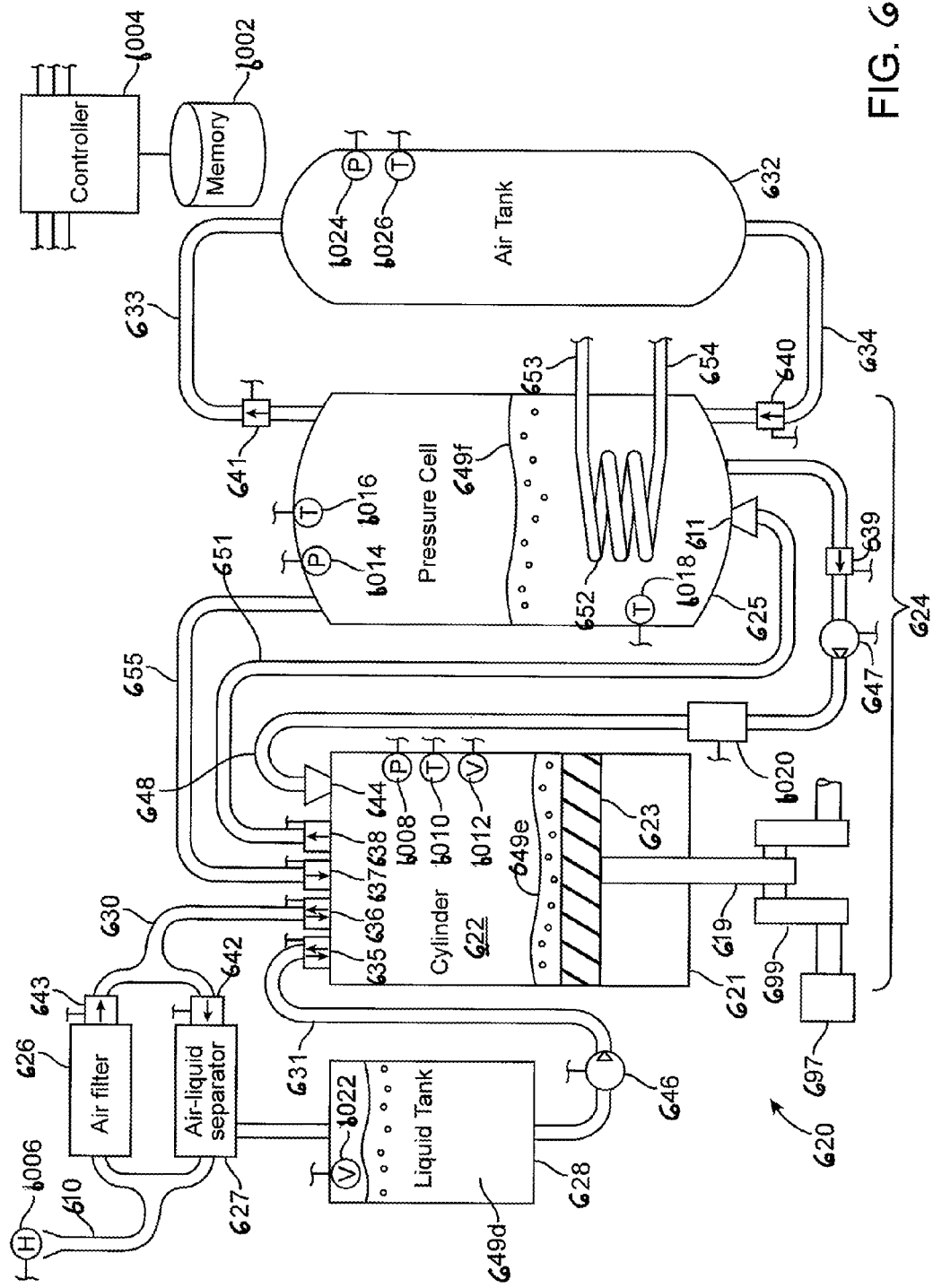
FIGS. 6-12 show various embodiments. While certain drawings and systems depicted herein may be configured using standard symbols, the drawings have been prepared in a more general manner to reflect the variety implementations that may be realized from different embodiments.

According to embodiments of the present invention, a compressed-air energy storage system is provided comprising a reversible mechanism to compress and expand air, one or more compressed air storage tanks, a control system, one or more heat exchangers, and, in certain embodiments of the invention, a motor-generator (for example motor-generator 697 of FIG. 6).

The reversible air compressor-expander uses mechanical power to compress air (when it is acting as a compressor) and converts the energy stored in compressed air to mechanical power (when it is acting as an expander). The compressor-expander comprises one or more stages, each stage consisting of pressure vessel (the "pressure cell") partially filled with water or other liquid. In some embodiments, the pressure vessel communicates with one or more cylinder devices to exchange air and liquid with the cylinder chamber(s) thereof. Suitable valving allows air to enter and leave the pressure cell and cylinder device, if present, under electronic control.

The cylinder device referred to above may be constructed in one of several ways. In one specific embodiment, it can have a piston connected to a piston rod, so that mechanical power coming in or out of the cylinder device is transmitted by this piston rod. In another configuration, the cylinder device can contain hydraulic liquid, in which case the liquid is driven by the pressure of the expanding air, transmitting power out of the cylinder device in that way. In such a configuration, the hydraulic liquid can interact with the air directly, or a diaphragm across the diameter of the cylinder device can separate the air from the liquid.

In low-pressure stages, liquid is pumped through an atomizing nozzle into the pressure cell or, in certain embodiments, the cylinder device during the expansion or compression stroke to facilitate heat exchange. The amount of liquid entering the chamber is sufficient to absorb (during compression) or release (during expansion) all the heat associated with the compression or expansion process, allowing those processes to proceed near-isothermally. This liquid is then returned to the pressure cell during the non-power phase of the stroke, where it can exchange heat with the external environment via a conventional heat exchanger. This allows the compression or expansion to occur at high efficiency.

Operation of embodiments according the present invention may be characterized by a magnitude of temperature change of the gas being compressed or expanded. According to one embodiment, during a compression cycle the gas may experience an increase in temperate of 100 degrees Celsius or less, or a temperature increase of 60 degrees Celsius or less. In some embodiments, during an expansion cycle, the gas may experience a decrease in temperature of 100 degrees Celsius or less, 15 degrees Celsius or less, or 11 degrees Celsius or less—nearing the freezing point of water from an initial point of room temperature.

Instead of injecting liquid via a nozzle, as described above, air may be bubbled though a quantity of liquid in one or more of the cylinder devices in order to facilitate heat exchange. This approach is preferred at high pressures.

During expansion, the valve timing is controlled electronically so that only so much air as is required to expand by the desired expansion ratio is admitted to the cylinder device. This volume changes as the storage tank depletes, so that the valve timing must be adjusted dynamically.

The volume of the cylinder chambers (if present) and pressure cells increases from the high to low pressure stages. In other specific embodiments of the invention, rather than having cylinder chambers of different volumes, a plurality of cylinder devices is provided with chambers of the same volume are used, their total volume equating to the required larger volume.

During compression, a motor or other source of shaft torque drives the pistons or creates the hydraulic pressure via a pump which compresses the air in the cylinder device. During expansion, the reverse is true. Expanding air drives the piston or hydraulic liquid, sending mechanical power out of the system. This mechanical power can be converted to or from electrical power using a conventional motor-generator.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention. It will be noted here that for a better understanding, like components are designated by like reference numerals throughout the various figures.

Single-Stage System

FIG. 6 depicts the simplest embodiment of the compressed air energy storage system 20 of the present invention, and illustrates many of the important principles. Briefly, some of these principles which improve upon current compressed air energy storage system designs include mixing a liquid with the air to facilitate heat exchange during compression and expansion, thereby improving the efficiency of the process, and applying the same mechanism for both compressing and expanding air. Lastly, by controlling the valve timing electronically, the highest possible work output from a given volume of compressed air can be obtained.

As best shown in FIG. 6, the energy storage system 620 includes a cylinder device 621 defining a chamber 622 formed for reciprocating receipt of a piston device 623 or the like therein. The compressed air energy storage system 620 also includes a pressure cell 625 which when taken together with the cylinder device 621, as a unit, form a one stage reversible compression/expansion mechanism (i.e., a one-stage 624). There is an air filter 626, a liquid-air separator 627, and a liquid tank 628, containing a liquid 649$d$ fluidly connected to the compression/expansion mechanism 624 on the low pressure side via pipes 630 and 631, respectively. On the high pressure side, an air storage tank or tanks 632 is connected to the pressure cell 625 via input pipe 633 and output pipe 634. A plurality of two-way, two position valves 635-643 are provided, along with two output nozzles 611 and 644. This particular embodiment also includes liquid pumps 646 and 647. It will be appreciated, however, that if the elevation of the liquid tank 628 is higher than that of the cylinder device 621, water will feed into the cylinder device by gravity, eliminating the need for pump 646.

Figure 11:
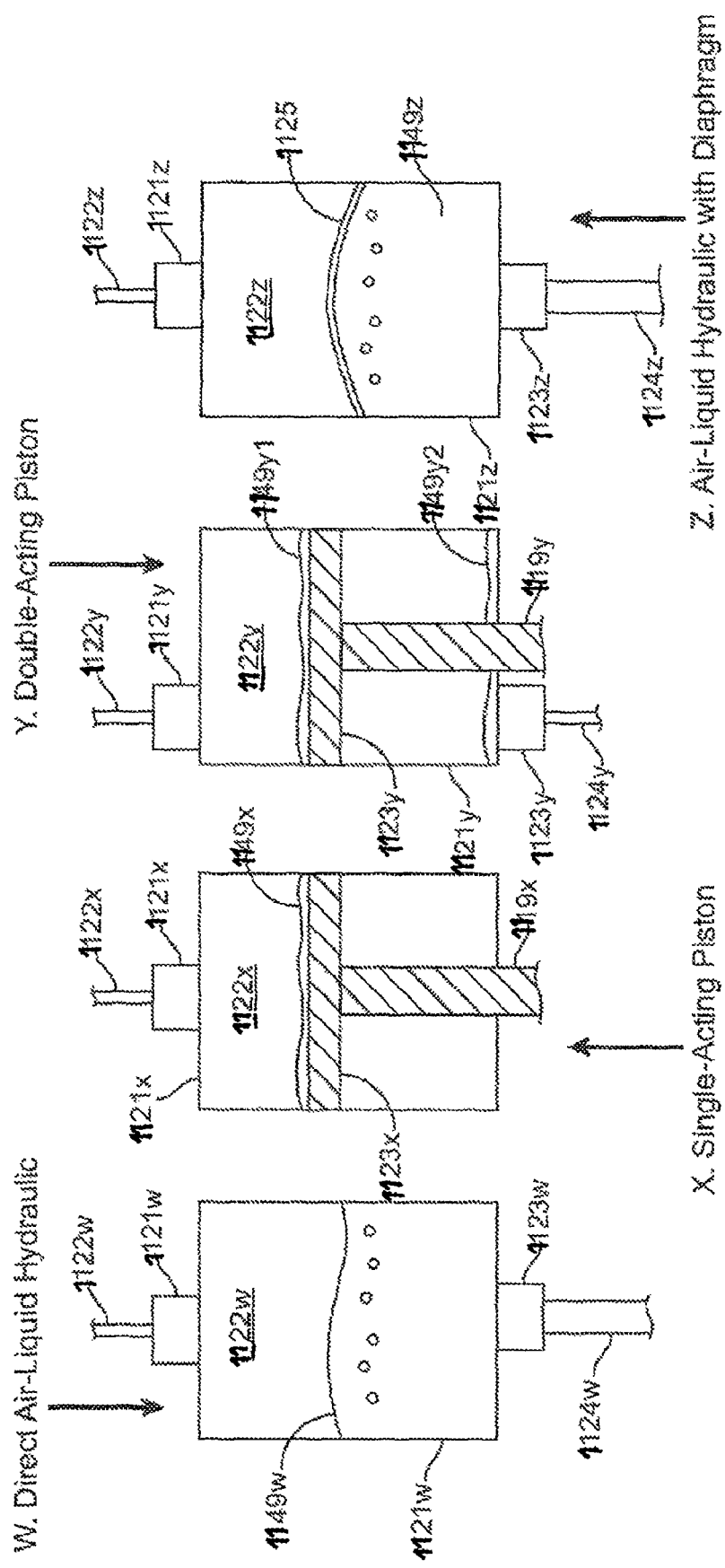

Briefly, atmospheric air enters the system via pipe 610, passes through the filter 626 and enters the cylinder chamber 622 of cylinder device 621, via pipe 630, where it is compressed by the action of piston 623, by hydraulic pressure, or by other mechanical approaches (see FIG. 11). Before compression begins, a liquid mist is introduced into the chamber 622 of the cylinder device 621 using an atomizing nozzle 644, via pipe 648 from the pressure cell 625. This liquid may be water, oil, or any appropriate liquid 649$f$ from the pressure cell having sufficient high heat capacity properties. The system preferably operates at substantially ambient temperature, so that liquids capable of withstanding high temperatures are not required. The primary function of the liquid mist is to absorb the heat generated during compression of the air in the cylinder chamber. The predetermined quantity of mist injected into the chamber during each compression stroke, thus, is that required to absorb all the heat generated during that stroke. As the mist condenses, it collects as a body of liquid 649$e$ in the cylinder chamber 622.

The compressed air/liquid mixture is then transferred into the pressure cell 625 through outlet nozzle 611, via pipe 651. In the pressure cell 625, the transferred mixture exchanges the captured heat generated by compression to a body of liquid 649*f* contained in the cell. The air bubbles up through the liquid and on to the top of the pressure cell, and then proceeds to the air storage tank 632, via pipe 633.

The expansion cycle is essentially the reverse process of the compression cycle. Air leaves the air storage tank 632, via pipe 634, bubbling up through the liquid 649*f* in the pressure cell 625, enters the chamber 622 of cylinder device 621, via pipe 655, where it drives piston 623 or other mechanical linkage. Once again, liquid mist is introduced into the cylinder chamber 622, via outlet nozzle 644 and pipe 648, during expansion to keep a substantially constant temperature in the cylinder chamber during the expansion process. When the air expansion is complete, the spent air and mist pass through an air-liquid separator 627 so that the separated liquid can be reused. Finally, the air is exhausted to the atmosphere via pipe 610.

The liquid 649*f* contained in the pressure cell 625 is continually circulated through the heat exchanger 652 to remove the heat generated during compression or to add the heat to the chamber to be absorbed during expansion. This circulating liquid in turn exchanges heat with a thermal reservoir external to the system (e.g. the atmosphere, a pond, etc.) via a conventional air or water-cooled heat exchanger (not shown in this figure). The circulating liquid is conveyed to and from that external heat exchanger via pipes 653 and 654 communicating with internal heat exchanger 652.

The apparatus of FIG. 6 further includes a controller/processor 6004 in electronic communication with a computer-readable storage device 6002, which may be of any design, including but not limited to those based on semiconductor principles, or magnetic or optical storage principles. Controller 6004 is shown as being in electronic communication with a universe of active elements in the system, including but not limited to valves, pumps, chambers, nozzles, and sensors. Specific examples of sensors utilized by the system include but are not limited to pressure sensors (P) 6008, 6014, and 6024, temperature sensors (T) 6010, 6018, 6016, and 6026, humidity sensor (H) 6006, volume sensors (V) 6012 and 6022, and flow rate sensor 6020.

As described in detail below, based upon input received from one or more system elements, and also possibly values calculated from those inputs, controller/processor 6004 may dynamically control operation of the system to achieve one or more objectives, including but not limited to maximized or controlled efficiency of conversion of stored energy into useful work; maximized, minimized, or controlled power output an expected power output an expected output speed of a rotating shaft in communication with the piston; an expected output torque of a rotating shaft in communication with the piston; an expected input speed of a rotating shaft in communication with the piston; an expected input torque of a rotating shaft in communication with the piston; a maximum output speed of a rotating shaft in communication with the piston; a maximum output torque of a rotating shaft in communication with the piston; a minimum output speed of a rotating shaft in communication with the piston; a minimum output torque of a rotating shaft in communication with the piston; a maximum input speed of a rotating shaft in communication with the piston; a maximum input torque of a rotating shaft in communication with the piston; a minimum input speed of a rotating shaft in communication with the piston; a minimum input torque of a rotating shaft in communication with the piston; or a maximum expected temperature difference of air at each stage.

The compression cycle for this single-stage system proceeds as follows:

| | Step | | | | |
|---|---|---|---|---|---|
| | 1 | 2 | 3 | 4 | 5 |
| | Description | | | | |
| | Add liquid to cylinder device | Add mist to cylinder device | Compress | Move compressed air to pressure cell | Refill cylinder device |
| Valve 635 | Open | Closed | Closed | Closed | Closed |
| Valve 636 | Open | Closed | Closed | Closed | Open |
| Valve 637 | Closed | Closed | Closed | Closed | Closed |
| Valve 638 | Closed | Closed | Closed | Open | Closed |
| Valve 639 | Closed | Open | Closed | Closed | Closed |
| Valve 640 | Closed | Closed | Closed | Closed | Closed |
| Valve 641 | Closed | Closed | Closed | Open | Closed |
| Valve 642 | Open | Closed | Closed | Closed | Closed |
| Valve 643 | Closed | Closed | Closed | Closed | Open |
| Pump 646 | On | Off | Off | Off | Off |
| Pump 647 | Off | On | Off | Off | Off |
| Piston 623 | Near bottom dead center (BDC) | Near BDC | At BDC at start of step | Between BDC and TDC | At TDC at start of step |

During step 1 of the compression cycle, liquid 649*d* is added to the chamber 622 of the cylinder device 621 from the liquid tank 628 (collecting as body of liquid 649*e*) such that, when the piston 623 reaches top dead center (TDC), the dead volume in the cylinder device is zero. This will only have to be done occasionally, so that this step is omitted on the great majority of cycles.

During step 2 of the compression cycle, liquid mist from pressure cell 625 is pumped, via pump 647, into the cylinder chamber 622, via pipe 648 and nozzle 644. The selected quantity of mist is sufficient to absorb the heat generated during the compression step (step 3). The volume fraction of liquid must sufficiently low enough that the droplets will not substantially fuse together, thus reducing the effective surface area available for heat exchange that is, the interface between air and liquid). Typically, the pressure differential between the pressure cell 625 and the chamber 622 of the cylinder device 621 is sufficiently high so that the operation of pump 647 is not required.

During step 3 of the compression cycle, the piston 623 is driven upward by a crankshaft 699 coupled to a piston rod 619, by hydraulic pressure, or by some other mechanical structure, compressing the air and mist contained in the cylinder chamber.

Step 4 of the compression cycle begins when the air pressure inside the cylinder chamber 622 is substantially equal to the pressure inside the pressure cell 625, at which point outlet valve 638 opens, allowing compressed air to flow from the cylinder chamber to the pressure cell. Because of the liquid added to the cylinder device during step 1 of the compression cycle, substantially all the air in the cylinder chamber can be pushed out during this step. The compressed air is introduced into the pressure cell 625 through an inlet nozzle 611, along with any entrained mist, creating fine bubbles so that the heat generated during compression will exchange with the liquid 649*f* in the cell rapidly.

During step 5 of the compression cycle, the piston 623 is pulled down allowing low-pressure air to refill it, via valve 636 and pipe 630. The above table shows valve 639 as being closed during this step, and shows pump 647 as being off during this step 5. However, this is not required. In other embodiments valve 639 could be open and pump 647 could be on, during the step 5 such that mist is introduced into the cylinder chamber as it is refilled with air.

The expansion cycle for this single-stage system proceeds as follows:

|  | Step | | | |
|---|---|---|---|---|
|  | 1 | 2 | 3 | 4 |
|  | | Description | | |
|  | Add liquid to cylinder device | Add compressed air and liquid mist to cylinder device | Expansion | Exhaust spent air |
| Valve 635 | Open | Closed | Closed | Closed |
| Valve 636 | Open | Closed | Closed | Open |
| Valve 637 | Closed | Open | Closed | Closed |
| Valve 638 | Closed | Closed | Closed | Closed |
| Valve 639 | Closed | Open | Closed | Closed |
| Valve 640 | Closed | Open | Closed | Closed |
| Valve 641 | Closed | Closed | Closed | Closed |
| Valve 642 | Closed | Closed | Closed | Open |
| Valve 643 | Closed | Closed | Closed | Closed |
| Pump 646 | On | Off | Off | Off |
| Pump 647 | Off | On | Off | Off |
| Piston 623 | Near TDC | At TDC at start of step | Near TDC at start of step | At BDC at start of step |

During step 1 of the expansion cycle, liquid is added to the cylinder chamber from the liquid tank 628 to eliminate dead volume in the system. This will be required only rarely, as mentioned above. Similar to the compression cycle, the pump 646 can be eliminated if the liquid tank 628 is oriented at an elevation higher than that of the chamber of cylinder device 621.

During step 2 of the expansion cycle, a pre-determined amount of air, $V_0$, is added to the chamber of the cylinder device by opening inlet valve 637 for the correct interval, which is dependent on the pressure of the air in the pressure cell and the desired expansion ratio. The $V_0$ required is the total cylinder device volume divided by the desired expansion ratio. For a single stage system, that ratio is less than or equal to the pressure of air in the air storage tank in atmospheres. At the same time air is being introduced into the cylinder chamber 622, liquid mist from the pressure cell is being pumped (via pump 647) through inlet nozzle 644 into the cylinder chamber. If a sufficient pressure differential exists between the pressure cell 625 and the cylinder device 621, pump 647 is not required. Once the pressure inside of the cylinder chamber is sufficiently high, valve 637 is closed. The piston 623 is urged in the direction of BDC beginning with this step, transmitting power out of the system via a crankshaft, hydraulic pressure, or other mechanical structure.

During step 3 of the expansion cycle, the air introduced in step 2 is allowed to expand in the chamber 622. Liquid mist also continues to be pumped into the chamber 622 through nozzle 644. The predetermined total amount of mist introduced is that required to add enough heat to the system to keep the temperature substantially constant during air expansion. The piston 623 is driven to the bottom of the cylinder device during this step.

It will be appreciated that this two-step expansion process (a quantity of air $V_0$ introduced in the first step—step 2—and then allowed to expand in the second step—step 3) allows the system to extract substantially all the energy available in the compressed air.

During step 4 of the expansion cycle, the crankshaft or other mechanical linkage moves the piston 619 back up to top dead-center (TDC), exhausting the spent air and liquid mist from the cylinder device. The power required to drive the piston comes from the momentum of the system and/or from the motion of other out-of-phase pistons. The exhausted air passes through an air-liquid separator, and the liquid that is separated out is returned to the liquid tank 628.

Options for Conveying Mechanical Power to and from the System

At least four methods may be applied to convey power to and from a stage in accordance with the present invention. These are described as follows, and illustrated in FIG. 11.

W. A direct-acting hydraulic cylinder device 1121w is shown and operates as follows. During the expansion cycle, air entering the chamber 1122w of cylinder device 1121w, via valve 1121w and pipe 1122w, urges the hydraulic liquid 1149w out through valve 1123w. It then flows through pipe 1124w. The force thus pneumatically applied against the liquid can be used to operate a hydraulic device (e.g., a hydraulic motor, a hydraulic cylinder device or a hydro turbine) to create mechanical power. During the compression cycle, the reverse process occurs. An external source of mechanical power operates a hydraulic pump or cylinder device, which forces hydraulic liquid 1149w into the cylinder chamber 1122w, through valve 1123w, compressing the air in the chamber. When the air has reached the desired pressure, valve 1121w is opened, allowing the compressed air to flow from the cylinder chamber 1122w to the next higher-pressure stage or to the air tank.

X. A single-acting piston 1123x may be connected to a conventional crankshaft via a piston rod 1119x. Its operation is described in detail in the section titled Single-Stage System above.

Y. A double-acting piston may similarly be connected to a crankshaft via a piston rod 1119y.

Z. A hydraulic cylinder device 1121 with a diaphragm 1125 is illustrated such that when air enters the cylinder chamber 1122z, via valve 1121z, during the expansion cycle, the diaphragm 1125 is forced downwardly. Consequently, the hydraulic liquid 1149z is urged or driven through valve 1123z and through pipe 1124z. Similarly, during compression, the hydraulic liquid 1149z is driven through valve 1123z and into the cylinder chamber 1122z, deflecting the diaphragm 1125 upwardly, compressing the air in the upper part of the chamber 1122z, which then exits via valve 1121z.

Note that all four of these options can be used with either the liquid mist technique or the bubbles technique to effect heat transfer. The necessary valves and nozzles to supply the mist or bubbles are not shown on FIG. 11.

While the above examples describe the use of pistons, other types of moveable elements may be utilized and still remain within the scope of the present invention. Examples of alternative types of apparatuses which could be utilized include but are not limited to screw compressors, multi-lobe blowers, vane compressors, gerotors, and quasi-turbines.

Figure 12:
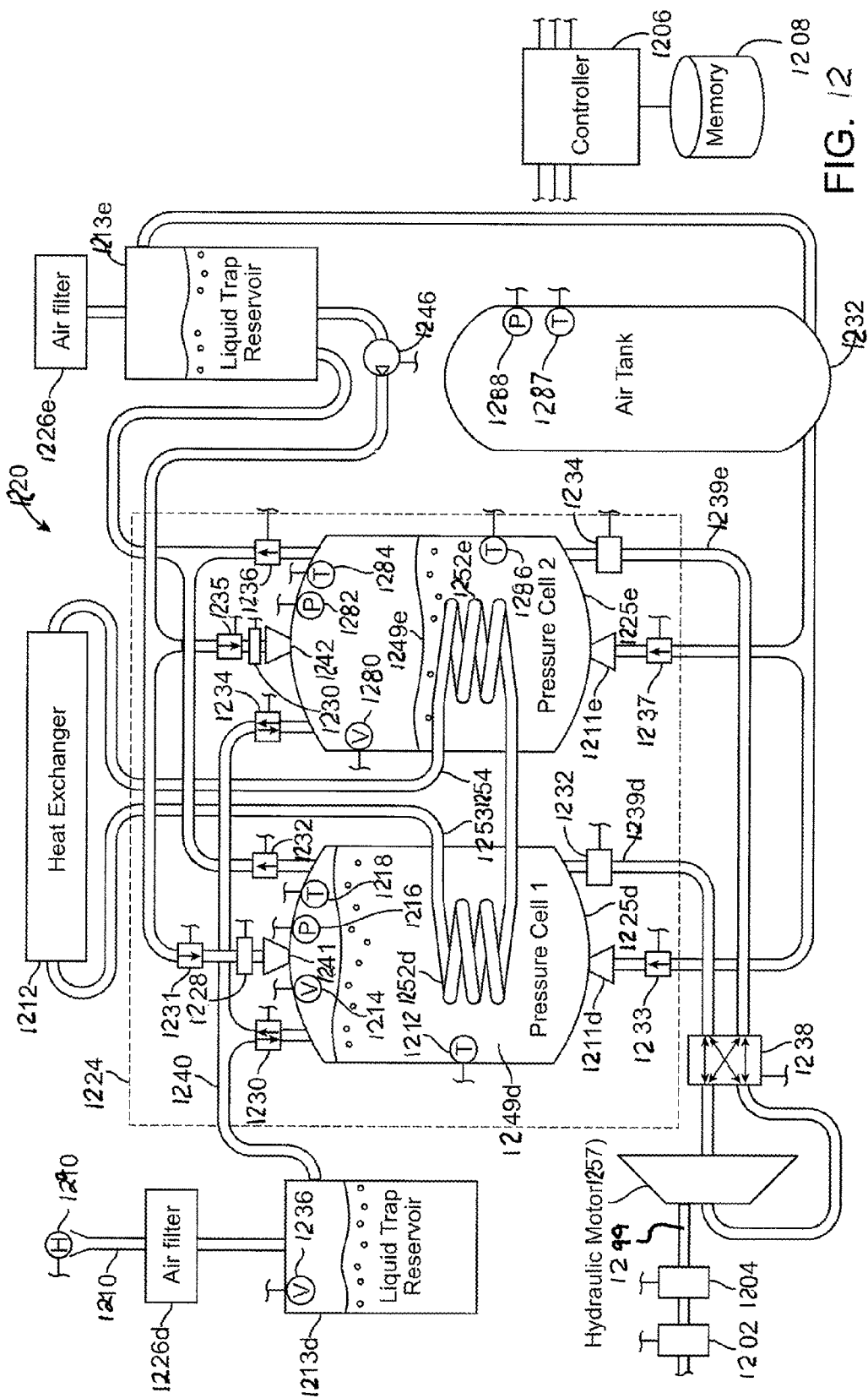

Single-Stage, Single-Acting Enemy Storage System:

Referring now to the embodiment of FIG. 12, a single-stage, single-acting energy storage system 1220 is illustrated that utilizes two pressure cells 1225d and 1225e configured as direct-acting hydraulic cylinder devices (option A above). The two pressure cells operate substantially 180 degrees out of phase with each other. Liquid mist is used to effect heat exchange during the compression cycle, and both bubbles and mist are used to effect heat exchange during the expansion cycle.

As described above in connection with FIG. 6, the apparatus of FIG. 12 further includes a controller/processor 1206 in electronic communication with a computer-readable storage device 1208, which may be of any design, including but not limited to those based on semiconductor principles, or magnetic or optical storage principles. Controller 1206 is shown as being in electronic communication with a universe of active elements in the system, including but not limited to valves, pumps, chambers, nozzles, and sensors. Specific examples of sensors utilized by the system include but are not limited to pressure sensors (P) 1216, 1282, and 1288, temperature sensors (T) 1212, 1218, 1284, 1286, and 1287, humidity sensor (H) 1290, and volume sensors (V) 1236, 1214, and 1280.

The compression cycle of the single-stage, single-acting energy storage system 20 proceeds as follows:

| | Step | | | |
|---|---|---|---|---|
| | 1 | 2 | 3 | 4 |
| | | Description | | |
| | Compress air in cell 1225d while spraying mist, and replenish the air in cell 1225e | Move compressed air from cell 1225d to air tank | Compress air in cell 1225e while spraying mist, and replenish the air in cell 1225d | Move compressed air from cell 1225e to air tank |
| Valve 1230 | Closed | Closed | Open | Open |
| Valve 1231 | Open | Open | Closed | Closed |
| Valve 1232 | Closed | Open | Closed | Closed |
| Valve 1233 | Closed | Closed | Closed | Closed |
| Valve 1234 | Open | Open | Closed | Closed |
| Valve 1235 | Closed | Closed | Open | Open |
| Valve 1236 | Closed | Closed | Closed | Open |
| Valve 1237 | Closed | Closed | Closed | Closed |
| Valve 1238 | Pump out to cell 1225d, pump in from cell 1225e | Pump out to cell 1225d, pump in from cell 1225e | Pump out to cell 1225e, pump in from cell 1225d | Pump out to cell 1225e, pump in from cell 1225d |
| Pump 46 | On | On | On | On |

During step 1, fluid is pumped from pressure cell 1225e using the hydraulic pump-motor 1257 into pressure cell 1225d, thereby compressing the air inside cell 1225d. Fluid mist is sprayed through nozzle 1241, which absorbs the heat of compression. When the pressure inside cell 1225d has reached the pressure of the air tank 1232, valve 1232 is opened to let the compressed air move to the air tank. As these steps have been progressing, air at atmospheric pressure has entered the system via pipe 1210 and air filter 1226d and thence into cell 1225e to replace the fluid pumped out of it.

When all the air has been driven out of cell 1225d, the process reverses, and step 3 commences, with the four-way valve 1238 changing state to cause liquid to be pumped out of cell 1225d and into cell 1225e, causing the air in cell 1225e to be compressed. Thus, liquid is pumped back and forth between cells 1225d and 1225e in a continuous cycle.

The expansion cycle of the single-stage, single-acting energy storage system proceeds as follows:

In step 1, compressed air is bubbled into pressure cell 1225d via nozzle 1211d. As the bubbles rise, they exchange heat with the body of fluid 1249d. Air is forced out of cell 1225d, passing through pipe 1239d, and then driving hydraulic motor 1257, thereby delivering mechanical power.

In step 2, the valve 1233 admitting the compressed air into cell 1225d is closed, allowing the air in cell 1225d to expand, continuing to operate motor 1257. In step 3, once the air admitted in step 1 has risen to the top of cell 1225d and can no longer exchange heat with the body of fluid 1249d, fluid mist is sprayed into the cell via nozzle 1241 to further warm the expanding air.

As fluid passes through the hydraulic motor 1257 during steps 1, 2, and 3, it continues through pipe 1239e and enters pressure cell 1225e, urging the air present in that cell through pipe 1240 and into the liquid trap-reservoir 1213d, and thence into the atmosphere via air filter 1226d and finally pipe 1210.

Steps 4, 5, and 6 mirror steps 1, 2, and 3. That is, compressed air is bubbled into pressure cell 1225e, forcing fluid through the hydraulic motor 1257, and then into pressure cell 1225d.

If reservoir 1213e is depleted during operation, excess liquid is pumped from the bottom of reservoir 1213d into cells 1225d and 1225e, using a pump, not shown in the figure, connected to pipe 1240.

Over time, both liquid traps 1213d and 1213e will change temperature due to the air and entrained droplets transferring heat—a heat exchanger, as shown by coils 1252d and 1252e, in pressure cells 1225d and 1225e, and connected to a conventional external heat exchanger 1212 that exchanges heat with the environment, will moderate the temperature to near ambient.

The volume of compressed air bubbled into the cells during steps 1 and 3 depends on the power output desired. If the air can expand fully to one atmosphere without displacing all the liquid in the cell, then the maximum amount of work will be done during the stroke. If the air does not fully expand during the stroke, all else being equal the power output will be higher at the expense of efficiency.

Note that the pressure cells cannot be of insufficient height so that the air bubbles reach the surface of the liquid during the course of the stroke, since almost all heat exchange with the body of liquid occurs while the bubbles are rising through it. However, they must be sufficiently tall for the column of bubbles to completely separate from the fluid by the time the exhaust stroke completes. If the system must be run slowly, some of the bubbles will reach the top before expansion completes. In this event, liquid mist is sprayed through nozzles 1241 (in step 3) or 1242 (in step 6) of the expansion cycle.

Note that all the configurations described herein use and generate power in mechanical form, be it hydraulic pressure or the reciprocating action of a piston. In most applications, however, the requirement will be for the storage of electrical energy. In that case, a generator, along with appropriate power conditioning electronics, must be added to convert the mechanical power supplied by the system during expansion to electrical power. Similarly, the mechanical power required by the system during compression must be supplied by a motor. Since compression and expansion are never done simultaneously, a motor-generator may be used to perform both functions. If the energy storage system utilizes a hydraulic motor or a hydro turbine (for example hydraulic motor 1257 of FIG. 12), then the shaft 1299 of that device connects directly or via a gearbox 1204 to the motor-generator 1202. If the energy storage system utilizes reciprocating pistons, then a crankshaft or other mechanical linkage that can convert reciprocating motion to shaft torque is required.

Use of Waste Heat During Expansion

In order to operate isothermally, the tendency of air to cool as it expands while doing work (i.e. by pushing a piston or displacing hydraulic liquid) must be counteracted by heat exchange with the ambient air or with a body of water (e.g. a stream or lake). If, however, some other source of heat is available—for example, hot water from a steam condenser—it may be used advantageously during the expansion cycle. In FIG. 6, as described in the Single-Stage System section above, pipes 653 and 654 lead to an external heat exchanger. If those pipes are routed instead to a heat source, the efficiency of the expansion process can be increased dramatically.

Because the system operates substantially at or near ambient temperature, the source of heat need only be a few degrees above ambient in order to be useful in this regard. The heat source must, however, have sufficient thermal mass to supply all the heat required to keep the expansion process at or above ambient temperature throughout the cycle.

According to certain embodiments, a temperature in the form of heat from a heat source, may be harnessed to generate useable energy from expansion of a compressed gas. A compressor-expander is in fluid communication with a compressed gas storage unit. Compressed gas received from the storage unit, expands in the compressor-expander to generate power. During expansion, the heat source is in selective thermal communication with the compressor-expander through a heat exchanger, to enhance power output. System operation may be further enhanced by introducing a fluid during expansion, and/or by controlling air flowed into and out of the compressor-expander during expansion.

In order to operate nearly isothermally, the tendency of gas to cool as it expands while doing work (i.e. by pushing a piston or displacing hydraulic liquid), can be counteracted by heat exchange with a heat source. If some form of heat is available, it may be harnessed to improve power output during an expansion cycle.

Because in many embodiments a compressed gas system is configured to operate substantially at or near ambient temperature, the source of heat need only be a few degrees above ambient in order to be useful in this regard. The heat source must, however, have sufficient thermal mass to supply all the heat required to keep the expansion process near ambient temperature throughout the cycle. Thus, embodiments of the present invention may be able to harness low grade heat, for example in the form of waste heat from another process, to enhance the power output from compressed air.

Figure 7:
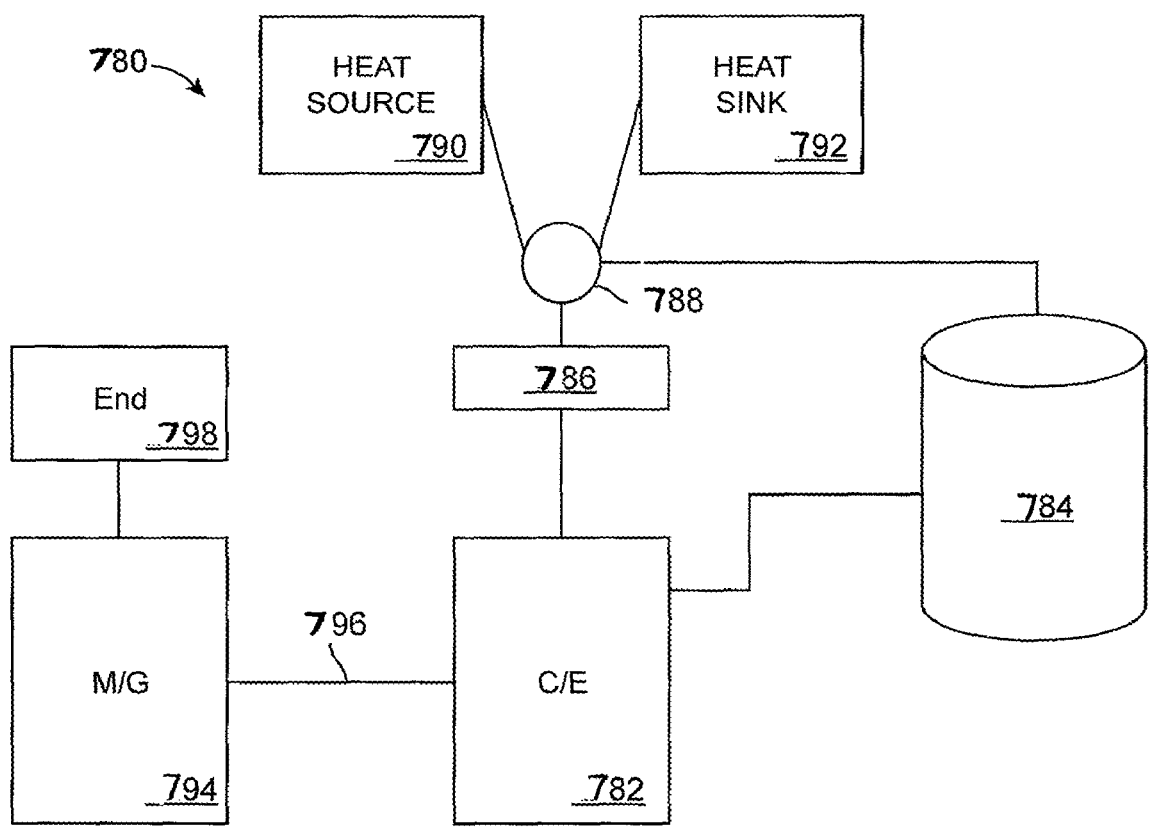

FIG. 7 shows a simplified block diagram of an embodiment of a system 780 according to the present invention, for generating energy from compressed air, although other forms of compressed gas could be used. The system includes a compressor-expander 782 which may have a structure similar to that described in U.S. provisional patent application No. 61/221,487 ("the '487 application"), but alternatively could be of another design.

Compressor-expander 782 is in fluid communication with compressed air storage unit 784. Compressor-expander 782 is in selective thermal communication through heat exchanger 786 and valve 788, with either heat source 790 or heat sink 792. Heat source 790 may be a source of low grade heat or high grade heat. Heat source 790 may be present continuously, or may be intermittent in nature.

Compressor-expander 782 is in physical communication with motor-generator 794 through linkage 796. Linkage 796 may be mechanical, hydraulic, or pneumatic, depending upon the particular embodiment. Motor-generator 794 is in turn in electrical communication with a power source such as the electrical grid 798.

Operation of the system 780 is described as follows. In a first mode, system 780 is configured to generate power by converting compressed air stored in the storage unit 784, into useable work. The system may be configured in this first mode, for example, at times of peak power demand on the grid, for example between 7 AM and 7 PM on weekdays.

Figure 7A:
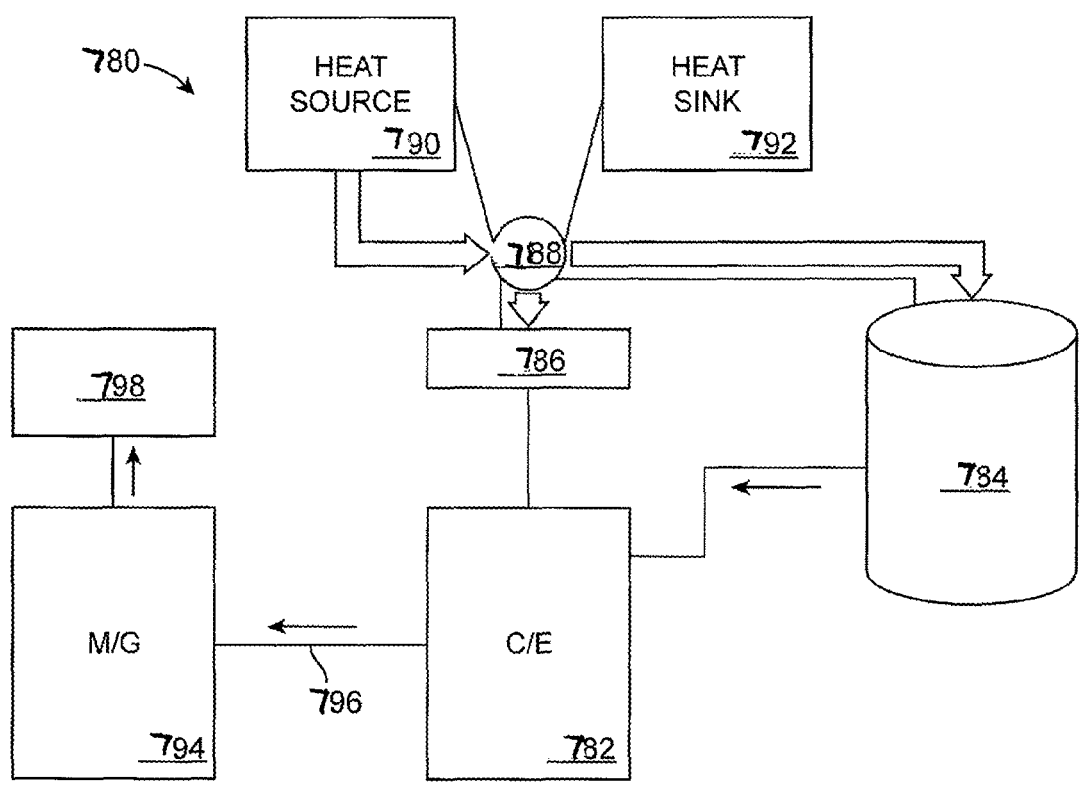

In this first mode depicted in FIG. 7A, compressed air is flowed from storage unit 784 to compressor-expander 782 which is functioning as an expander. Switch 788 is configured to allow thermal communication between heat source 790 and heat exchanger 786 and/or storage unit 784.

As a result of the contribution of heat from the heat source in this mode, air expanding in the compressor-expander experiences a reduced change in temperature, thereby producing an increased power output. This power output is in turn communicated through linkage 796 to motor-generator 794 that is functioning as a generator. Power output from the motor-generator may in turn be fed onto the power grid 798 for consumption.

In a second mode of operation, system 780 is configured to replenish the supply of compressed air in the storage tank. The system may be configured in this second mode, for example, at times of reduced demand for power on the power grid.

Figure 7B:
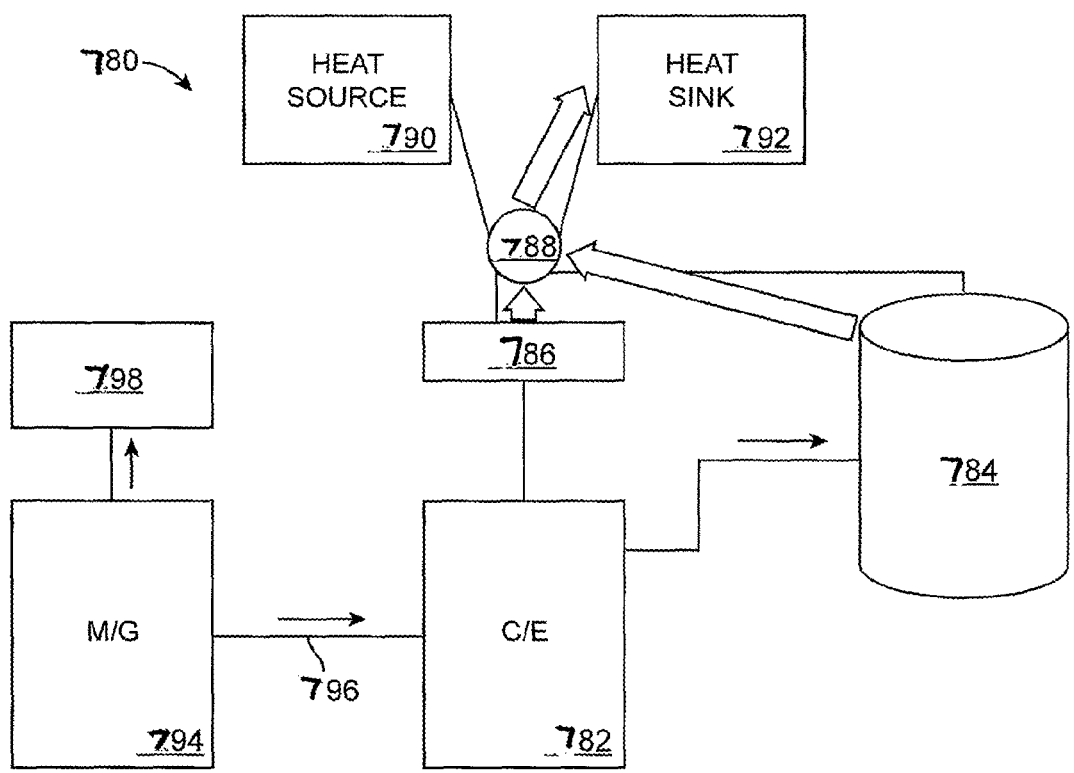

In this second mode shown in FIG. 7B, motor-generator 794 receives power from the power grid 798 (or directly from another source such as a wind turbine or solar energy harvesting unit), and actuates linkage to operate compressor-expander 782 as a compressor. Switch 788 is configured to allow thermal communication between heat sink 792 and heat exchanger 786 and/or storage unit 784.

As a result of the transfer of heat from the compressor-expander to the to the heat sink in this mode, air being compressed in the compressor-expander experiences a reduced change in temperature, thereby resulting in a lower energy loss upon its conversion into compressed air. The compressed air is in turn communicated from the compressor-expander to the compressed air storage unit 784, for later recovery in the first mode.

In certain embodiments, switch 788 may be temporal in nature, such that it operates according to the passage of time. An example of this would be the diurnal cycle, wherein during the day the heat exchanger and/or storage unit are in thermal communication with the sun as a heat source. Conversely, at night the heat exchanger and/or storage unit would be in thermal communication with the cooling atmosphere as a heat sink. In such embodiments, the magnitude of the heat source could be amplified by techniques such as reflection onto the heat exchanger and/or storage tank, or by providing the heat exchanger and/or storage tank with a coating configured to enhance absorption of solar radiation.

In certain embodiments, switch 788 may be physical in nature, such that it is actuable to allow warm fluid from the heat source to be in proximity with the heat exchanger and/or storage unit, or to allow cool fluid from the heat sink to be in proximity with the heat exchanger and/or storage unit. Examples of this type of configuration include a switch that is in selectively in fluid communication with pipes leading to a power plant as the heat source, or to a body of water (such as a cooling tower, lake, or the ocean) as the heat sink.

Operation of the various embodiments of systems described above, can be enhanced utilizing one or more techniques employed alone or in combination. One such technique is the introduction of a liquid into the air as it is expanding or being compressed. Specifically where the liquid exhibits a greater heat capacity than the air, the transfer of heat from compressing air, and the transfer of heat to expanding air, would be improved. This greater heat transfer would in turn allow the temperature of the compressing or expanding air to remain more constant. Such introduction of liquid during compression and expansion is discussed in detail in the '487 Application.

In certain embodiments, the liquid is introduced as a mist through a spray device. In other embodiments, the gas may be introduced by bubbling through a liquid. Other embodiments may employ both misting and bubbling, and/or multiple stages (see below) which employ misting and/or bubbling only in certain stages. We compute, during operation—and adjust as necessary—the volume of liquid spray required to maintain the ΔT of compression or expansion at the desired level.

Another technique which may employed to enhance operation of the system, is precise control over gas flows within the compressor-expander. Such precise control may be achieved utilizing a controller or processor that is configured to be in electronic communication with various elements of the compressor-expander.

Figure 8:
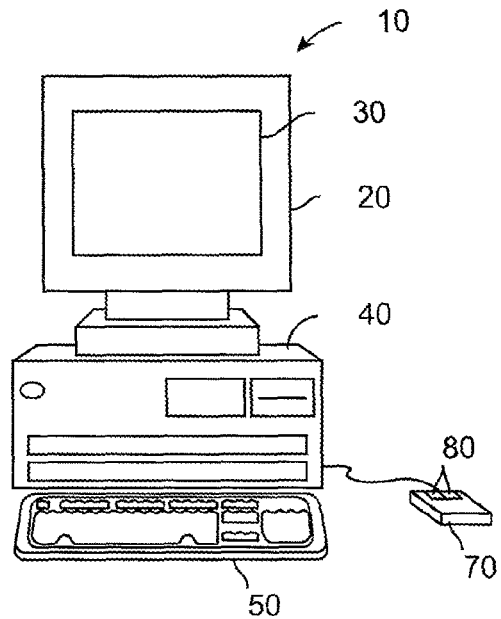

As described in detail above, embodiments of systems and methods for storing and recovering energy according to the present invention are particularly suited for implementation in conjunction with a host computer including a processor and a computer-readable storage medium. Such a processor and computer-readable storage medium may be embedded in the apparatus, and/or may be controlled or monitored through external input/output devices. FIG. 8 is a simplified diagram of a computing device for processing information according to an embodiment of the present invention. This diagram is merely an example, which should not limit the scope of the claims herein. One of ordinary skill in the art would recognize many other variations, modifications, and alternatives. Embodiments according to the present invention can be implemented in a single application program such as a browser, or can be implemented as multiple programs in a distributed computing environment, such as a workstation, personal computer or a remote terminal in a client server relationship.

FIG. 8 shows computer system 810 including display device 820, display screen 830, cabinet 840, keyboard 850, and mouse 870. Mouse 870 and keyboard 850 are representative "user input devices." Mouse 870 includes buttons 880 for selection of buttons on a graphical user interface device. Other examples of user input devices are a touch screen, light pen, track ball, data glove, microphone, and so forth. FIG. 8 is representative of but one type of system for embodying the present invention. It will be readily apparent to one of ordinary skill in the art that many system types and configurations are suitable for use in conjunction with the present invention. In a preferred embodiment, computer system 810 includes a Pentium™ class based computer, running Windows™ XP™ or Windows 7™ operating system by Microsoft Corporation. However, the apparatus is easily adapted to other operating systems and architectures by those of ordinary skill in the art without departing from the scope of the present invention.

As noted, mouse 870 can have one or more buttons such as buttons 880. Cabinet 840 houses familiar computer components such as disk drives, a processor, storage device, etc. Storage devices include, but are not limited to, disk drives, magnetic tape, solid-state memory, bubble memory, etc. Cabinet 840 can include additional hardware such as input/output (I/O) interface cards for connecting computer system 810 to external devices external storage, other computers or additional peripherals, further described below.

Figure 8A:
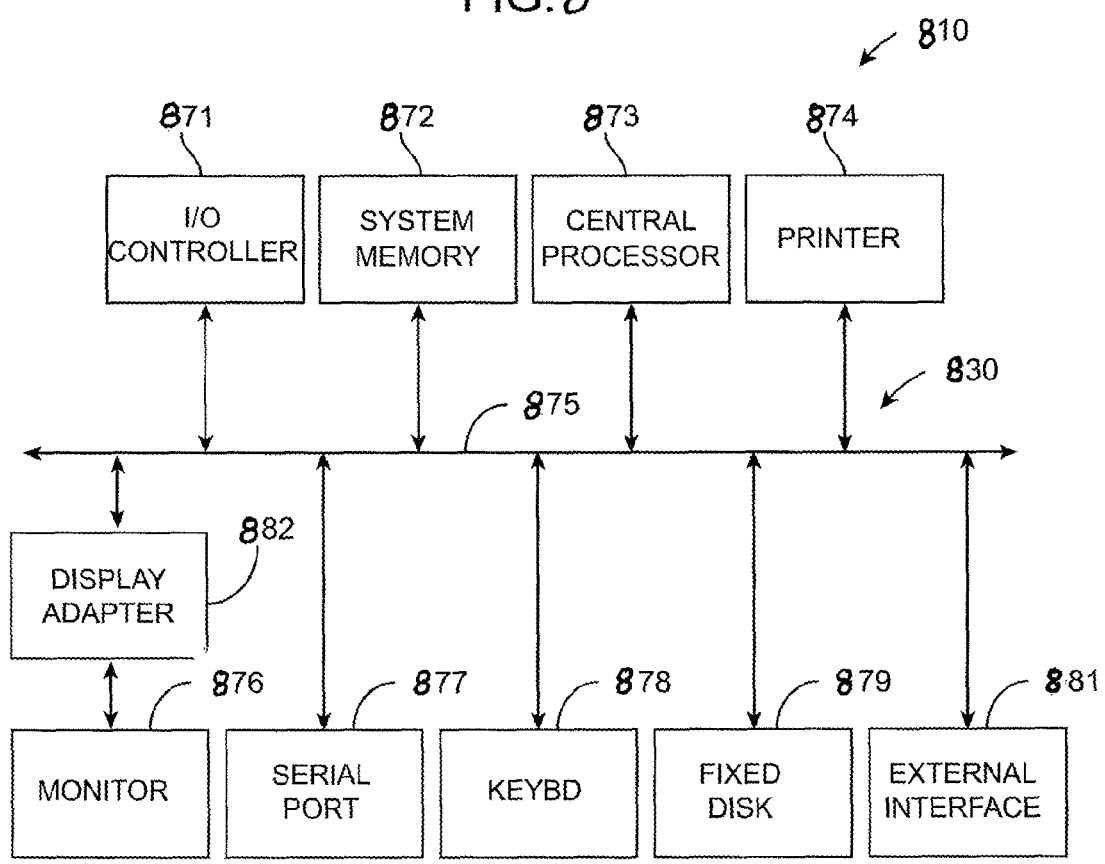

FIG. 8A is an illustration of basic subsystems in computer system 810 of FIG. 8. This diagram is merely an illustration and should not limit the scope of the claims herein. One of ordinary skill in the art will recognize other variations, modifications, and alternatives. In certain embodiments, the subsystems are interconnected via a system bus 875. Additional subsystems such as a printer 874, keyboard 878, fixed disk 879, monitor 876, which is coupled to display adapter 882, and others are shown. Peripherals and input/output (I/O) devices, which couple to I/O controller 871, can be connected to the computer system by any number of approaches known in the art, such as serial port 877. For example, serial port 877 can be used to connect the computer system to a modem 881, which in turn connects to a wide area network such as the Internet, a mouse input device, or a scanner. The interconnection via system bus allows central processor 873 to communicate with each subsystem and to control the execution of instructions from system memory 872 or the fixed disk 879, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

Figure 9:
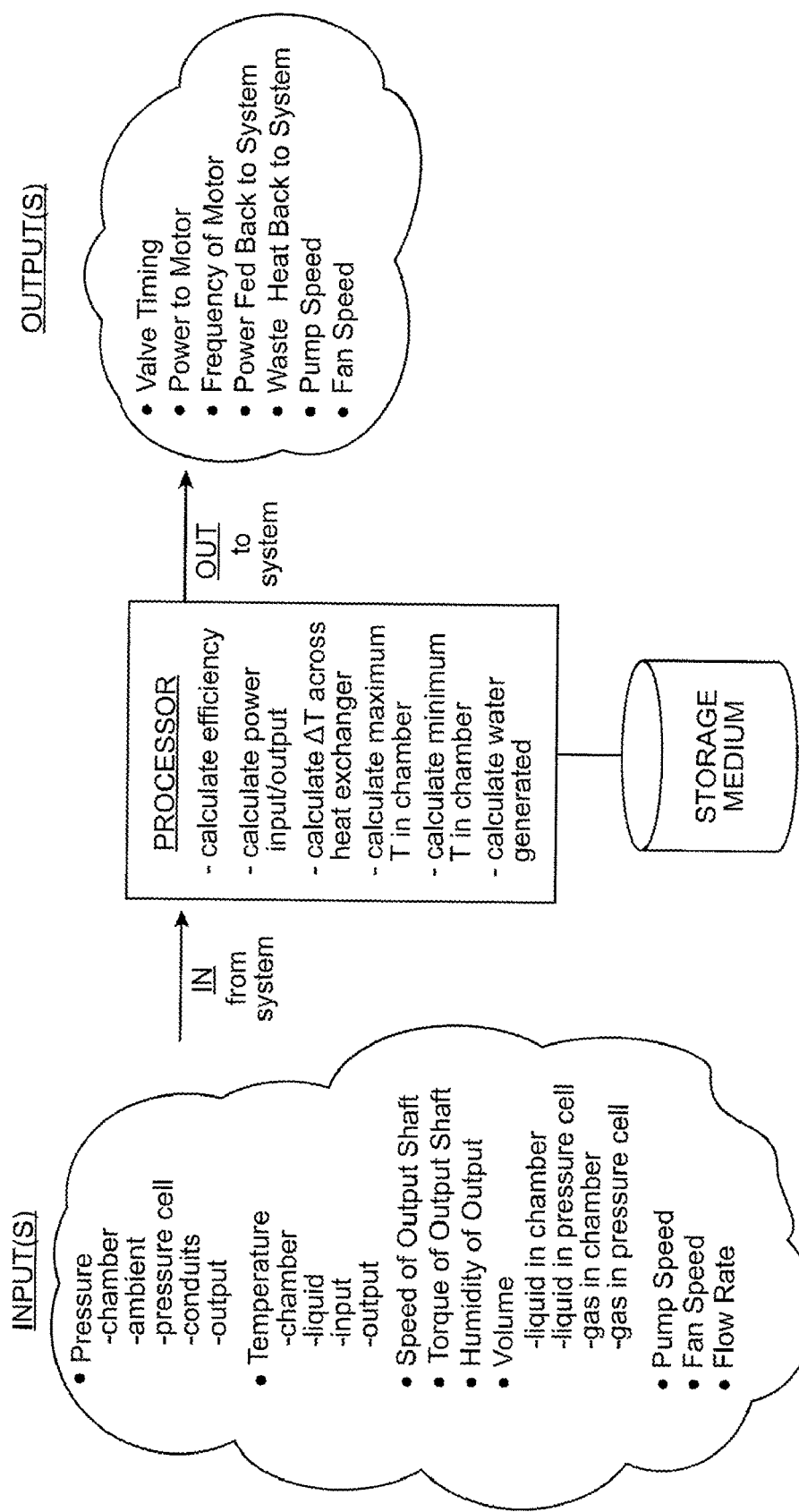

FIG. 9 is a schematic diagram showing the relationship between the processor/controller, and the various inputs received, functions performed, and outputs produced by the processor controller. As indicated, the processor may control various operational properties of the apparatus, based upon one or more inputs.

Figure 10A:
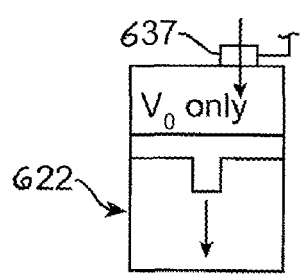
Figure 10B:
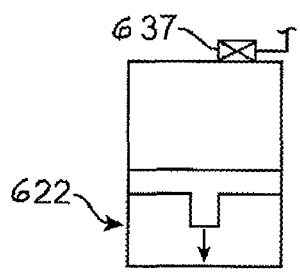
Figure 10C:
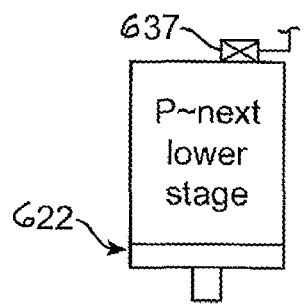

An example of such an operational parameter that may be controlled is the timing of opening and closing of a valve allowing the inlet of air to the cylinder during an expansion cycle. FIGS. 10A-C is a simplified and enlarged view of the cylinder 622 of the single-stage system of FIG. 6, undergoing an expansion cycle as described previously.

Specifically, during step 2 of the expansion cycle, a predetermined amount of air $V_0$, is added to the chamber from the pressure cell, by opening valve 637 for a controlled interval of time. This amount of air $V_0$ is calculated such that when the piston reaches the end of the expansion stroke, a desired pressure within the chamber will be achieved.

In certain cases, this desired pressure will approximately equal that of the next lower pressure stage, or atmospheric pressure if the stage is the lowest pressure stage or is the only stage. Thus at the end of the expansion stroke, the energy in the initial air volume $V_0$ has been fully expended, and little or no energy is wasted in moving that expanded air to the next lower pressure stage.

To achieve this goal, valve 637 is opened only for so long as to allow the desired amount of air ($V_0$) to enter the chamber, and thereafter in steps 3-4 (FIGS. 10B-C), valve 637 is maintained closed. In certain embodiments, the desired pressure within the chamber may be within 1 psi, within 5 psi, within 10 psi, or within 20 psi of the pressure of the next lower stage.

In other embodiments, the controller/processor may control valve 637 to cause it to admit an initial volume of air that is greater than $V_0$. Such instructions may be given, for example, when greater power is desired from a given expansion cycle, at the expense of efficiency of energy recovery.

Figure 10D:
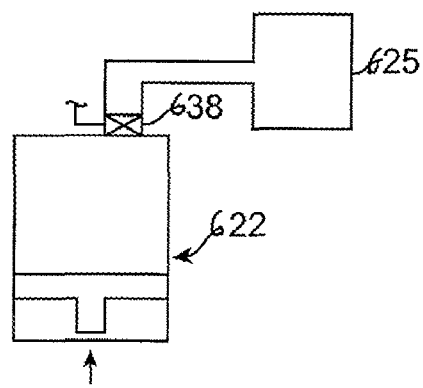
Figure 10E:
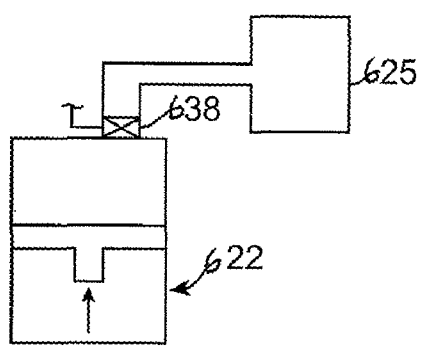

Timing of opening and closing of valves may also be carefully controlled during compression. For example, as shown in FIGS. 10D-E, in the steps 2 and 3 of the table corresponding to the addition of mist and compression, the valve 638 between the cylinder device and the pressure cell remains closed, and pressure builds up within the cylinder.

In conventional compressor apparatuses, accumulated compressed air is contained within the vessel by a check valve, that is designed to mechanically open in response to a threshold pressure. Such use of the energy of the compressed air to actuate a check valve, detracts from the efficiency of recovery of energy from the air for performing useful work.

Figure 10F:
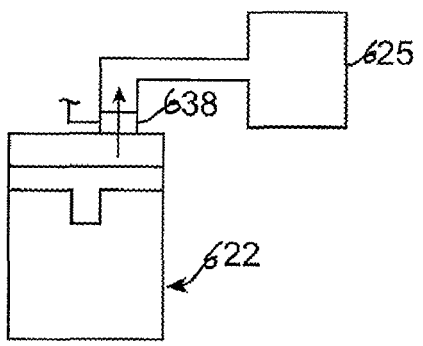

By contrast, as shown in FIG. 10F, embodiments of the present invention may utilize the controller/processor to precisely open valve 638 under the desired conditions, for example where the built-up pressure in the cylinder exceeds the pressure in the pressure cell by a certain amount. In this manner, energy from the compressed air within the cylinder is not consumed by the valve opening process, and efficiency of energy recovery is enhanced. Embodiments of valve types that may be subject to control to allow compressed air to flow out of a cylinder include but are not limited to pilot valves, cam-operated poppet valves, rotary valves, hydraulically actuated valves, and electronically actuated valves.

Another example of a system parameter that can be controlled by the processor, is the amount of liquid introduced into the chamber. Based upon one or more values such as pressure, humidity, calculated efficiency, and others, an amount of liquid that is introduced into the chamber during compression or expansion, can be carefully controlled to maintain efficiency of operation. For example, where an amount of air greater than $V_0$ is inlet into the chamber during an expansion cycle, additional liquid may need to be introduced in order to maintain the temperature of that expanding air within a desired temperature range.

What is claimed is:

1. An energy storage system comprising:
    a wind turbine;
    a gas compressor configured to be operated by the wind turbine through a linkage, the gas compressor comprising an element to effect gas-liquid heat exchange with compressed gas, wherein the gas compressor comprises,
       a chamber defined within at least one wall,
       valving allowing selective fluid communication between the chamber and the compressed gas storage unit, and
       a moveable member received within the chamber to be selectively driven by the wind turbine to compress gas within the chamber;
    a compressed gas storage unit in fluid communication with the gas compressor, and configured to store gas compressed by the gas compressor; and
    a generator configured to generate electrical power from expansion of compressed gas flowed from the compressed gas storage unit, wherein
    the moveable member is selectively configurable to transmit out of the chamber to the generator, a power of the compressed gas flowed from the compressed gas storage unit expanding within the chamber; and
    the element is configured to effect gas-liquid heat exchange with the compressed gas flowed from the compressed gas storage unit expanding within the chamber in an absence of combustion.

2. The system of claim 1 further comprising a nacelle in rotational communication with a support structure through a joint, the nacelle housing the wind turbine, the generator, and an expander in fluid communication with the compressed gas storage unit and in physical communication with the generator.

3. The system of claim 1 wherein the linkage comprises a mechanical linkage.

4. The system of claim 3 wherein the mechanical linkage comprises a gear.

5. The system of claim 1 wherein the linkage comprises a hydraulic linkage.

6. The system of claim 1 wherein the linkage comprises a pneumatic linkage.

7. The system of claim 3 wherein the mechanical linkage comprises a rotating shaft.

8. The system of claim 3 wherein the mechanical linkage comprises a crankshaft.

9. The system of claim 1 wherein the moveable member is configured to reciprocate within the chamber.

10. The system of claim 1 wherein the movable member is configured to rotate within the chamber.

11. An energy storage system comprising:
    a wind turbine;
    a gas compressor configured to be operated by the wind turbine through a linkage, the gas compressor comprising an element to effect gas-liquid heat exchange with compressed gas;
    compressed gas storage unit in fluid communication with the gas compressor, and configured to store gas compressed by the gas compressor;
    a generator configured to generate electrical power from expansion of compressed gas flowed from the compressed gas storage unit;
    a gas expander comprising a chamber defined within at least one wall;
    valving allowing selective fluid communication between the chamber and the compressed gas storage unit;
    a moveable member received within the chamber and selectively configurable to transmit out of the chamber, a power of the compressed gas flowed from the compressed gas storage unit expanding within the chamber; and
    a second element configured to effect gas-liquid heat exchange with the compressed gas flowed from the compressed gas storage unit expanding within the chamber in an absence of combustion.

12. The system of claim 11 wherein the gas expander comprises a dedicated expander in communication with the generator.

13. The system of claim 11 wherein the gas expander comprises a reversible expander/compressor such that the moveable member is configured to be selectively driven to flow compressed gas to the compressed gas storage unit.

14. The system of claim 11 wherein the moveable member is configured to reciprocate within the chamber.

15. The system of claim 14 wherein the moveable member comprises a solid piston.

16. The system of claim 14 wherein the moveable member comprises a hydraulic liquid.

17. The system of claim 11 wherein the movable member is configured to rotate within the chamber.

18. The system of claim 11 wherein the movable member is in communication with the generator through a rotating shaft.

19. The system of claim 18 further comprising a control unit configured to:
   receive an input comprising a torque of the rotating shaft;
   calculate an output power from the input; and
   based upon the output power, control a timing of opening of a valve admitting the compressed gas flowed from the compressed gas storage unit.

20. The system of claim 11 further comprising a control unit configured to:
   receive an input comprising a temperature in the chamber;
   calculate an efficiency from the input; and
   based upon the efficiency, control a timing of opening of a valve admitting the compressed gas flowed from the compressed gas storage unit.

* * * * *